United States Patent
Karaoguz et al.

(10) Patent No.: US 9,043,833 B2
(45) Date of Patent: *May 26, 2015

(54) SYSTEM AND METHOD IN A TELEVISION SYSTEM FOR PRESENTING INFORMATION ASSOCIATED WITH A USER-SELECTED OBJECT IN A TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 12/881,067

(22) Filed: Sep. 13, 2010

(65) Prior Publication Data

US 2011/0067063 A1    Mar. 17, 2011

Related U.S. Application Data

(60) Provisional application No. 61/242,234, filed on Sep. 14, 2009.

(51) Int. Cl.
*H04N 7/10* (2006.01)
*H04N 7/025* (2006.01)
(Continued)

(52) U.S. Cl.
CPC ............ *G06F 3/0346* (2013.01); *G06F 3/0304* (2013.01); *G06F 3/0325* (2013.01); *G06F 3/0428* (2013.01); *H04N 21/234318* (2013.01); *H04N 21/23892* (2013.01); *H04N 21/42204* (2013.01); *H04N 21/4325* (2013.01); *H04N 21/4334* (2013.01); *H04N 21/4725* (2013.01); *H04N 21/4728* (2013.01); *H04N 21/845* (2013.01); *G06F 3/0386* (2013.01); *H04N 5/76* (2013.01); *H04N 9/8205* (2013.01);
(Continued)

(58) Field of Classification Search
CPC . H04N 21/254; H04N 1/2541; H04N 1/2542; H04N 1/2543; H04N 1/25435; H04N 1/2547
USPC .......................................................... 725/32
See application file for complete search history.

(56) References Cited

U.S. PATENT DOCUMENTS 5,111,511 A    5/1992 Ishii et al.
5,408,258 A    4/1995 Kolessar
(Continued)

FOREIGN PATENT DOCUMENTS

CN    1193869 A    9/1998
CN    1300501 A    6/2001
(Continued)

OTHER PUBLICATIONS

Office Action from related U.S. Appl. No. 12/880,530 dated Aug. 2, 2012.
(Continued)

*Primary Examiner* — Justin Shepard
(74) *Attorney, Agent, or Firm* — Brinks Gilson & Lione

(57) ABSTRACT

A system and method in a television system for presenting information associated with a user-selected object in a television program is provided. An identity of a user-selected object in a television program being presented to a user is determined. Based at least in part on the identity of the user-selected object in the television program, information to present to the user is determined. The determined information is presented to the user on a television display.

29 Claims, 7 Drawing Sheets

(51) Int. Cl.

| | |
|---|---|
| H04N 5/445 | (2011.01) |
| H04N 7/173 | (2011.01) |
| G06F 3/00 | (2006.01) |
| G06F 13/00 | (2006.01) |
| G06F 3/0346 | (2013.01) |
| G06F 3/03 | (2006.01) |
| G06F 3/042 | (2006.01) |
| H04N 21/2343 | (2011.01) |
| H04N 21/2389 | (2011.01) |
| H04N 21/422 | (2011.01) |
| H04N 21/432 | (2011.01) |
| H04N 21/433 | (2011.01) |
| H04N 21/4725 | (2011.01) |
| H04N 21/4728 | (2011.01) |
| H04N 21/845 | (2011.01) |
| G06F 3/038 | (2013.01) |
| H04N 5/76 | (2006.01) |
| H04N 9/82 | (2006.01) |
| H04N 5/44 | (2011.01) |

(52) U.S. Cl.
    CPC  H04N2005/4428 (2013.01); H04N 2005/4432 (2013.01)

(56) References Cited

U.S. PATENT DOCUMENTS

| | | | |
|---|---|---|---|
| 5,543,851 | A | 8/1996 | Chang |
| 5,602,568 | A | 2/1997 | Kim |
| 5,708,845 | A | 1/1998 | Wistendahl |
| 5,718,845 | A | 2/1998 | Drost |
| 5,721,584 | A | 2/1998 | Yoshinobu et al. |
| 5,727,141 | A | 3/1998 | Hoddie |
| 5,793,361 | A | 8/1998 | Kahn et al. |
| 5,929,849 | A | 7/1999 | Kikinis |
| 6,097,441 | A | 8/2000 | Allport |
| 6,122,660 | A | 9/2000 | Baransky et al. |
| 6,133,911 | A | 10/2000 | Kim |
| 6,255,961 | B1 | 7/2001 | Van Ryzin et al. |
| 6,314,569 | B1 | 11/2001 | Chernock et al. |
| 6,317,714 | B1 | 11/2001 | Del Castillo et al. |
| 6,349,410 | B1 | 2/2002 | Lortz |
| 6,407,779 | B1 | 6/2002 | Herz |
| 6,538,672 | B1 | 3/2003 | Dobbelaar |
| 6,931,660 | B1 | 8/2005 | Kalluri et al. |
| 7,053,965 | B1 | 5/2006 | Fan |
| 7,057,670 | B2 | 6/2006 | Kikinis |
| 7,102,616 | B1 | 9/2006 | Sleator |
| 7,158,676 | B1 | 1/2007 | Rainsford |
| 7,301,530 | B2 | 11/2007 | Lee et al. |
| 7,344,084 | B2 | 3/2008 | DeCosta |
| 7,360,232 | B2 | 4/2008 | Mitchell |
| 7,535,456 | B2 | 5/2009 | Liberty |
| 7,536,706 | B1 | 5/2009 | Sezan |
| 7,612,748 | B2 | 11/2009 | Tateuchi |
| 7,631,338 | B2 | 12/2009 | Del Sesto et al. |
| 7,805,747 | B2 | 9/2010 | Klappert |
| 7,827,577 | B2 | 11/2010 | Pack |
| 7,864,159 | B2 | 1/2011 | Sweetser et al. |
| 7,889,175 | B2 | 2/2011 | Kryze et al. |
| 7,890,380 | B2 | 2/2011 | Stefanik |
| 7,987,478 | B2 | 7/2011 | Minor |
| 8,068,781 | B2 | 11/2011 | Ilan et al. |
| 8,095,423 | B2 | 1/2012 | Nichols |
| 8,181,212 | B2 | 5/2012 | Sigal |
| 8,223,136 | B2 | 7/2012 | Hu et al. |
| 8,269,746 | B2 | 9/2012 | Hodges et al. |
| 8,290,513 | B2 | 10/2012 | Forstall et al. |
| 8,359,628 | B2 | 1/2013 | Kitaru et al. |
| 8,421,746 | B2 | 4/2013 | Igoe |
| 8,608,535 | B2 | 12/2013 | Weston |
| 2001/0019368 | A1 | 9/2001 | Holme et al. |
| 2001/0023436 | A1 | 9/2001 | Srinivasan |
| 2001/0047298 | A1 | 11/2001 | Moore |
| 2002/0040482 | A1* | 4/2002 | Sextro et al. ............. 725/136 |
| 2002/0042925 | A1 | 4/2002 | Ebisu |
| 2002/0056136 | A1 | 5/2002 | Wistendahl |
| 2002/0069405 | A1 | 6/2002 | Chapin et al. |
| 2002/0078446 | A1 | 6/2002 | Dakss |
| 2002/0090114 | A1 | 7/2002 | Rhoads |
| 2002/0120934 | A1 | 8/2002 | Abrahams |
| 2002/0136432 | A1 | 9/2002 | Koike et al. |
| 2002/0162120 | A1 | 10/2002 | Mitchell |
| 2003/0005445 | A1 | 1/2003 | Schein |
| 2003/0023981 | A1 | 1/2003 | Lemmons |
| 2003/0035075 | A1 | 2/2003 | Butler et al. |
| 2003/0054878 | A1 | 3/2003 | Benoy et al. |
| 2003/0115602 | A1* | 6/2003 | Knee et al. ............. 725/42 |
| 2003/0145326 | A1 | 7/2003 | Gutta et al. |
| 2003/0212996 | A1 | 11/2003 | Wolzien |
| 2003/0236752 | A1 | 12/2003 | Dawson et al. |
| 2004/0078814 | A1 | 4/2004 | Allen |
| 2004/0119701 | A1 | 6/2004 | Mulligan et al. |
| 2004/0167855 | A1 | 8/2004 | Cambridge |
| 2004/0221025 | A1 | 11/2004 | Johnson et al. |
| 2004/0236865 | A1 | 11/2004 | Ullman |
| 2005/0028208 | A1 | 2/2005 | Ellis |
| 2005/0086690 | A1 | 4/2005 | Gilfix et al. |
| 2005/0132420 | A1 | 6/2005 | Howard et al. |
| 2005/0137958 | A1 | 6/2005 | Huber et al. |
| 2005/0153687 | A1 | 7/2005 | Niemenmaa et al. |
| 2005/0193425 | A1 | 9/2005 | Sull et al. |
| 2005/0229227 | A1 | 10/2005 | Rogers |
| 2005/0234782 | A1 | 10/2005 | Schackne et al. |
| 2005/0251835 | A1 | 11/2005 | Scott |
| 2005/0262542 | A1 | 11/2005 | DeWeese et al. |
| 2006/0037044 | A1 | 2/2006 | Daniels |
| 2006/0099964 | A1 | 5/2006 | Barrese et al. |
| 2006/0152489 | A1 | 7/2006 | Sweetser et al. |
| 2006/0174273 | A1 | 8/2006 | Park |
| 2006/0195878 | A1 | 8/2006 | Pack et al. |
| 2006/0241864 | A1 | 10/2006 | Rosenberg |
| 2006/0259930 | A1 | 11/2006 | Rothschild |
| 2006/0268895 | A1 | 11/2006 | Kotzin |
| 2006/0282847 | A1* | 12/2006 | Gupte ............. 725/25 |
| 2007/0097275 | A1 | 5/2007 | Dresti et al. |
| 2007/0130581 | A1 | 6/2007 | Del Sesto et al. |
| 2007/0156521 | A1 | 7/2007 | Yates |
| 2007/0157260 | A1 | 7/2007 | Walker |
| 2007/0195205 | A1 | 8/2007 | Lowe |
| 2007/0199014 | A1 | 8/2007 | Clark et al. |
| 2007/0266406 | A1 | 11/2007 | Aravamudan |
| 2007/0277201 | A1 | 11/2007 | Wong |
| 2007/0300263 | A1 | 12/2007 | Barton |
| 2008/0052750 | A1 | 2/2008 | Grunnet-Jepsen |
| 2008/0066097 | A1 | 3/2008 | Park et al. |
| 2008/0066129 | A1 | 3/2008 | Katcher et al. |
| 2008/0109851 | A1 | 5/2008 | Heather |
| 2008/0136754 | A1 | 6/2008 | Tsuzaki et al. |
| 2008/0172693 | A1 | 7/2008 | Ludvig |
| 2008/0204603 | A1 | 8/2008 | Hattori |
| 2008/0204605 | A1 | 8/2008 | Tsai |
| 2008/0209480 | A1 | 8/2008 | Eide |
| 2009/0021473 | A1 | 1/2009 | Grant et al. |
| 2009/0037947 | A1 | 2/2009 | Patil |
| 2009/0077394 | A1 | 3/2009 | Tsai et al. |
| 2009/0083815 | A1 | 3/2009 | McMaster et al. |
| 2009/0113475 | A1 | 4/2009 | Li |
| 2009/0165041 | A1 | 6/2009 | Penberthy et al. |
| 2009/0165048 | A1 | 6/2009 | Nishimura |
| 2009/0187862 | A1 | 7/2009 | DaCosta |
| 2009/0199259 | A1* | 8/2009 | Alao et al. ............. 725/147 |
| 2009/0217317 | A1* | 8/2009 | White ............. 725/32 |
| 2009/0235312 | A1 | 9/2009 | Morad |
| 2009/0237572 | A1 | 9/2009 | Kishimoto |
| 2009/0271815 | A1 | 10/2009 | Contin et al. |
| 2009/0296686 | A1 | 12/2009 | Pirani et al. |
| 2009/0327894 | A1 | 12/2009 | Rakib et al. |
| 2010/0064320 | A1 | 3/2010 | Angiolillo et al. |
| 2010/0098074 | A1* | 4/2010 | Kokernak et al. ............. 370/389 |
| 2010/0157152 | A1 | 6/2010 | Weitbruch et al. |
| 2010/0162303 | A1 | 6/2010 | Cassanova |

(56) References Cited

U.S. PATENT DOCUMENTS

| | | |
|---|---|---|
| 2010/0218228 A1 | 8/2010 | Walter |
| 2011/0063523 A1 | 3/2011 | Karaoguz et al. |
| 2011/0066929 A1 | 3/2011 | Karaoguz et al. |
| 2011/0067062 A1 | 3/2011 | Karaoguz et al. |
| 2011/0067063 A1 | 3/2011 | Karaoguz et al. |
| 2011/0067064 A1 | 3/2011 | Karaoguz et al. |
| 2011/0067069 A1 | 3/2011 | Karaoguz et al. |
| 2011/0141013 A1 | 6/2011 | Matthews |
| 2011/0179435 A1 | 7/2011 | Cordray |
| 2012/0079525 A1 | 3/2012 | Ellis |
| 2012/0154268 A1 | 6/2012 | Alten |
| 2012/0163776 A1 | 6/2012 | Hassell et al. |

FOREIGN PATENT DOCUMENTS

| | | |
|---|---|---|
| CN | 1329796 A | 1/2002 |
| WO | WO 99/04559 A1 | 1/1999 |
| WO | WO 2007/137611 | 12/2007 |
| WO | WO 2007/137611 A1 | 12/2007 |
| WO | WO 2009/033500 A1 | 3/2009 |

OTHER PUBLICATIONS

Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/851,036 dated Aug. 22, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Final Office Action from related U.S. Appl. No. 12/774,321 dated Jun. 27, 2013.
Non-Final Office Action from related U.S. Appl. No. 12/774,154 dated Aug. 14, 2013.
Non-Final Office Action from related U.S. Appl. No. 12/850,945 dated Aug. 27, 2013.
Non-Final Office Action from related U.S. Appl. No. 12/880,668 dated Jun. 10, 2013.
Final Office Action from related U.S. Appl. No. 12/774,380 dated Jun. 11, 2013.
Final Office Action from related U.S. Appl. No. 12/880,851 dated Sep. 10, 2013.
Non-Final Office Action from related U.S. Appl. No. 12/881,031 dated Sep. 10, 2013.
Office Action from related U.S. Appl. No. 12/881,004 dated Nov. 1, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Office Action from related U.S. Appl. No. 12/850,866 dated Oct. 4, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Final Office Action from related U.S. Appl. No. 12/774,154 dated Apr. 10, 2013.
Final Office Action from related U.S. Appl. No. 12/881,004 dated Mar. 7, 2013.
Final Office Action from related U.S. Appl. No. 12/851,036 dated Feb. 26, 2013.
Final Office Action from related U.S. Appl. No. 12/851,075 dated Mar. 5, 2013.
Final Office Action from related U.S. Appl. No. 12/774,221 dated Feb. 26, 2013.
Final Office Action from related U.S. Appl. No. 12/850,832 dated Feb. 25, 2013.
Final Office Action from related U.S. Appl. No. 12/850,866 dated Mar. 29, 2013.
Final Office Action from related U.S. Appl. No. 12/850,945 dated Apr. 26, 2013.
Office Action from related U.S. Appl. No. 12/774,154 dated Dec. 5, 2012.
Final Office Action from related U.S. Appl. No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl. No. 12/880,888 dated Dec. 6, 2012.
Office Action from related U.S. Appl. No. 12/774,380 dated Jan. 8, 2013.
Final Office Action from related U.S. Appl. No. 12/880,965 dated Jan. 11, 2013.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/850,530 dated Apr. 9, 2014.
Non-Final Office Action from related U.S. Appl. No. 12/774,380 dated Apr. 15, 2014.
Final Office Action from related U.S. Appl. No. 12/774,321 dated Jun. 2, 2014.
Intel, "Intel Ethernet Switch Converged Enhanced Ethernet (CEE) and Datacenter Bridging (DCB)", White Paper, Feb. 2009, pp. 1-14.
Final Office Action from related U.S. Appl. No. 12/774,154 dated Feb. 27, 2014.
Final Office Action from related U.S. Appl. No. 12/881,031 dated Mar. 6, 2014.
Final Office Action from related U.S. Appl. No. 12/880,749 dated Mar. 13, 2014.
Final Office Action from related U.S. Appl. No. 12/774,221 dated Jan. 29, 2014.
Final Office Action from related U.S. Appl. No. 12/880,851 dated Feb. 12, 2014.
Non-Final Office Action from related U.S. Appl. No. 12/774,321 dated Feb. 7, 2014.
Non-Final Office Action from related U.S. Appl. No. 12/850,832 dated Mar. 24, 2014.

(56) References Cited

OTHER PUBLICATIONS

Non-Final Office Action from related U.S. Appl. No. 12/881,031 dated Jul. 25, 2014.
Final Office Action from related U.S. Appl. No. 12/880,530 dated Aug. 18, 2014.
Non-Final Office Action from related U.S. Appl. No. 12/880,749 dated Jul. 30, 2014.
Non-Final Office Action from related U.S. Appl. No. 12/850,866 dated Aug. 14, 2014.
Non-Final Office Action from related U.S. Appl. No. 12/859,911 dated Aug. 14, 2014.
Non-Final Office Action from related U.S. Appl. No. 12/850,945 dated Jul. 25, 2014.
Non-Final Office Action from related U.S. Appl. No. 12/774,221 dated Sep. 20, 2013.
Non-Final Office Action from related U.S. Appl. No. 12/880,749 dated Oct. 4, 2013.
Non-Final Office Action from related U.S. Appl. No. 12/881,004 dated Oct. 30, 2013.
Non-Final Office Action from related U.S. Appl. No. 12/880,594 dated Oct. 22, 2013.
Final Office Action from related U.S. Appl. No. 12/880,668 dated Nov. 26, 2013.
Non-Final Office Action from related U.S. Appl. No. 12/880,888 dated Nov. 4, 2013.
Final Office Action from related U.S. Appl. No. 12/850,945 dated Dec. 16, 2013.

* cited by examiner

SYSTEM AND METHOD IN A TELEVISION SYSTEM FOR PRESENTING INFORMATION ASSOCIATED WITH A USER-SELECTED OBJECT IN A TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/880,530, filed concurrently herewith, titled "SYSTEM AND METHOD IN A DISTRIBUTED SYSTEM FOR RESPONDING TO USER-SELECTION OF AN OBJECT IN A TELEVISION PROGRAM"; U.S. patent application Ser. No. 12/880,594, filed concurrently herewith, titled "SYSTEM AND METHOD IN A LOCAL TELEVISION SYSTEM FOR RESPONDING TO USER-SELECTION OF AN OBJECT IN A TELEVISION PROGRAM"; U.S. patent application Ser. No. 12/880,668, filed concurrently herewith, titled "SYSTEM AND METHOD IN A TELEVISION SYSTEM FOR RESPONDING TO USER-SELECTION OF AN OBJECT IN A TELEVISION PROGRAM BASED ON USER LOCATION"; U.S. patent application Ser. No. 12/881,096, filed concurrently herewith, titled "SYSTEM AND METHOD IN A TELEVISION SYSTEM FOR PRESENTING INFORMATION ASSOCIATED WITH A USER-SELECTED OBJECT IN A TELEVISION PROGRAM"; U.S. patent application Ser. No. 12/880,749, filed concurrently herewith, titled "SYSTEM AND METHOD IN A TELEVISION SYSTEM FOR RESPONDING TO USER-SELECTION OF AN OBJECT IN A TELEVISION PROGRAM UTILIZING AN ALTERNATIVE COMMUNICATION NETWORK"; U.S. patent application Ser. No. 12/851,036, filed concurrently herewith, titled "SYSTEM AND METHOD IN A TELEVISION SYSTEM FOR PROVIDING FOR USER-SELECTION OF AN OBJECT IN A TELEVISION PROGRAM"; U.S. patent application Ser. No. 12/851,075, filed concurrently herewith, titled "SYSTEM AND METHOD IN A PARALLEL TELEVISION SYSTEM FOR PROVIDING USER-SELECTION OF OBJECTS IN A TELEVISION PROGRAM"; U.S. patent application Ser. No. 12/880,851, filed concurrently herewith, titled "SYSTEM AND METHOD IN A TELEVISION FOR PROVIDING ADVERTISING INFORMATION ASSOCIATED WITH A USER-SELECTED OBJECT IN A TELEVISION PROGRAM"; U.S. patent application Ser. No. 12/880,888, filed concurrently herewith, titled "SYSTEM AND METHOD IN A TELEVISION FOR PROVIDING INFORMATION ASSOCIATED WITH A USER-SELECTED PERSON IN A TELEVISION PROGRAM"; U.S. patent application Ser. No. 12/881,110, filed concurrently herewith, titled "SYSTEM AND METHOD IN A TELEVISION FOR PROVIDING INFORMATION ASSOCIATED WITH A USER-SELECTED INFORMATION ELEMENT IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of providing for and/or conveniently providing for user-selection of objects in a television program, much less responding to such selection. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a television system for presenting information associated with a user-selected object in a television program, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
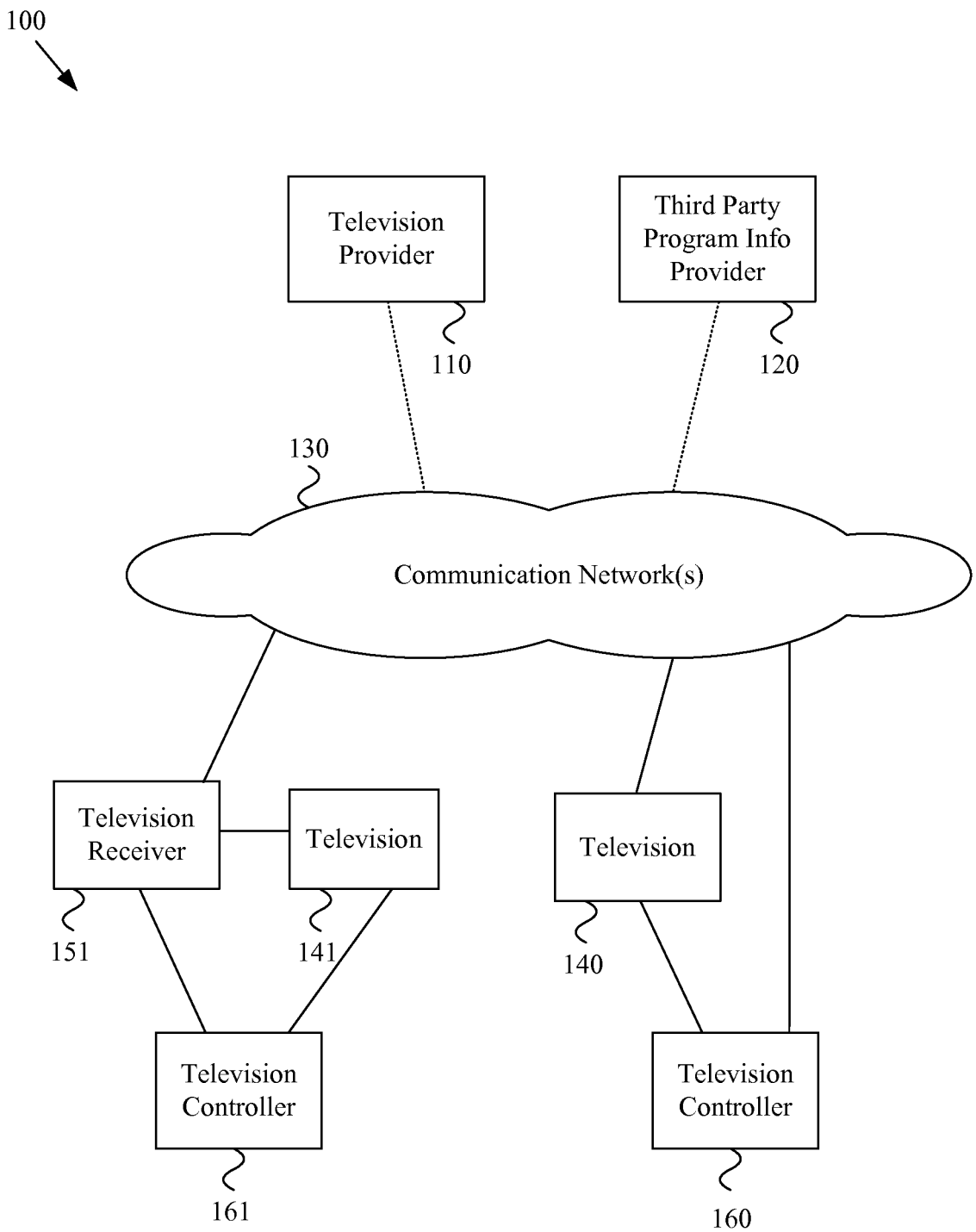
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television modules, television receiver modules, television controller modules, modules of a user's local television system, modules of a geographically distributed television system, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion may at times refer to an on-screen pointing location. Such a pointing location refers to a location on the television screen (e.g., a primary television screen, a secondary television screen, etc.) to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television system, comprise receiving a television program, presenting such received television program to a user, determining an object in the television program that has been selected by the user, determining based on the user-selected object one or more actions to perform with entities remote from the user's local television system, and performing such determined one or more actions.

Also, the following discussion will at times refer to user-selectable objects in television programming. Such user-selectable objects include both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., clothing, automobiles, shoes, jewelry, furniture, food, beverages, appliances, electronics, toys, artwork, cosmetics, recreational vehicles, sports equipment, safety equipment, computer equipment, communication devices, books, etc.), premises objects (e.g., business locations, stores, hotels, signs, doors, buildings, landmarks, historical sites, entertainment venues, hospitals, government buildings, etc.), objects related to services (e.g., objects related to transportation, objects related to emergency services, objects related to general government services, objects related to entertainment services, objects related to food and/or drink services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reports, analysts, hosts/hostesses, entertainers, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in programming, etc.). The television provider 110 may, for example, operate to (which includes "operate when enabled to") perform any or all of the functionality discussed herein.

The exemplary television system 100 may also include a third party program information provider 120. Such a provider may, for example, provide information related to a television program. Such information may, for example, comprise information describing selectable objects in programming, information to provide to a user upon selection of a selectable object in programming, information related to various actions that may be performed (e.g., with networked entities remote from the user's local television system) upon user selection of a selectable object, program guide information, etc. The third party program information provider 120 may, for example, operate to (which includes "operate when enabled to") perform any or all of the functionality discussed herein.

The exemplary television system 100 may include one or more communication networks (e.g., the communication network(s) 130). The exemplary communication network 130 may comprise characteristics of any of a variety of types of communication networks over which television programming and/or information related to television programming (e.g., information identifying and/or describing and/or otherwise related to user-selectable objects in television programming) may be communicated. For example and without limitation, the communication network 130 may comprise characteristics of any one or more of: a cable television network, a satellite television network, a telecommunication network, a general data network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.). The first television 140 may, for example, operate to (which includes "operate when enabled to") perform any or all of the functionality discussed herein.

The exemplary television system 100 may include a first television controller 160. Such a first television controller 160 may, for example, operate to (e.g., which includes "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, any personal electronic device with television control capability, etc. The first television controller 160 may, for example, operate to (which includes "operate when enabled to") perform any or all of the functionality discussed herein. In a non-limiting exemplary configuration, the first television controller 160 may comprise an on-board display which may operate as a television screen (e.g., a primary, secondary and/or parallel television screen) via which the first television controller 160 may present television programming and/or interface with a user regarding user-selectable objects in television programming.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing and/or object selection information with the first television 140 and/or other devices. Also, as will be discussed in more detail later, various aspects of the present invention include a user selecting a user-selectable object in programming. Such selection may, for example, be performed by the user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

As will be mentioned throughout the following discussion, various aspects of the invention will be performed by one or more devices, components and/or modules of a user's local television system. The first television 140 and first television controller 160 provide a non-limiting example of a user's local television system. Such a user's local television system, for example, generally refers to the television-related devices that are local to the television system currently being utilized by the user. For example, when a user is utilizing a television system located at the user's home, the user's local television system generally refers to the television-related devices that make up the user's home television system. Also for example, when a user is utilizing a television system at a premises away from the user's home, the user's local television system generally refers to the television-related devices that make up the premises television system. Such a user's local television system does not, for example, comprise television network infrastructure devices that are generally outside of the user's current premises (e.g., cable and/or satellite head-end apparatus, cable and/or satellite communication intermediate communication network nodes) and/or programming source devices that are generally managed by television enterprises and generally exist outside of the user's home. Such entities, which may be communicatively coupled to the user's local television system, may be considered to be entities remote from the user's local (or home) television system (or "remote entities"). Such remote entities may also, for example, include networked entities generally remote from the user's current and/or home premises, where such entities are independent of the television program delivery system (e.g., Internet web sites, networked databases, networked information servers, etc.).

The exemplary television system 100 may also include a television receiver 151. The television receiver 151 may, for example, operate to (e.g., which includes "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.). The television receiver 151 may, for example, be a stand-alone component (e.g., a set top box) or may be integrated with any of a variety of other television system components (e.g., a television, a video recorder, a gaming station, etc.). The television receiver 151 may, for example, operate to (which includes "operate when enabled to") perform any or all of the functionality discussed herein.

The exemplary television system 100 may include a second television controller 161. Such a second television controller 161 may, for example, operate to (e.g., which includes "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, any personal electronic device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.). The second television controller 161 may further, for example, operate to receive signals from the second television 141 and/or television receiver 151. Such signals may, for example, comprise signals communicating television programming, information identifying and/or describing user-selectable objects in television programming and/or any of a variety of other information to the second television controller 161. As a non-limiting example, the second television controller 161 may comprise an on-board display which may operate as a television (e.g., a primary television, secondary television, parallel television (presenting on the on-board display a same television program as that being presented by the second television 141), etc.). In such a configuration, the second television controller 161 may, for example, operate to perform any or all of the functionality discussed herein.

As will be discussed in more detail later, various aspects of the present invention include a user selecting a user-selectable object in programming. Such selection may, for example, comprise the user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location. Also, in a scenario in which the second television controller 161 comprises a touch screen, a user may touch a location of such touch screen to point to an on-screen location (e.g., to select a user-selectable object).

As will be mentioned throughout the following discussion, and as mentioned previously in the discussion of the first television 140 and television controller 160, various aspects of the invention will be performed by one or more devices, components and/or modules of a user's local television system. The second television 141, television receiver 151 and second television controller 161 provide another non-limiting example of a user's local television system.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
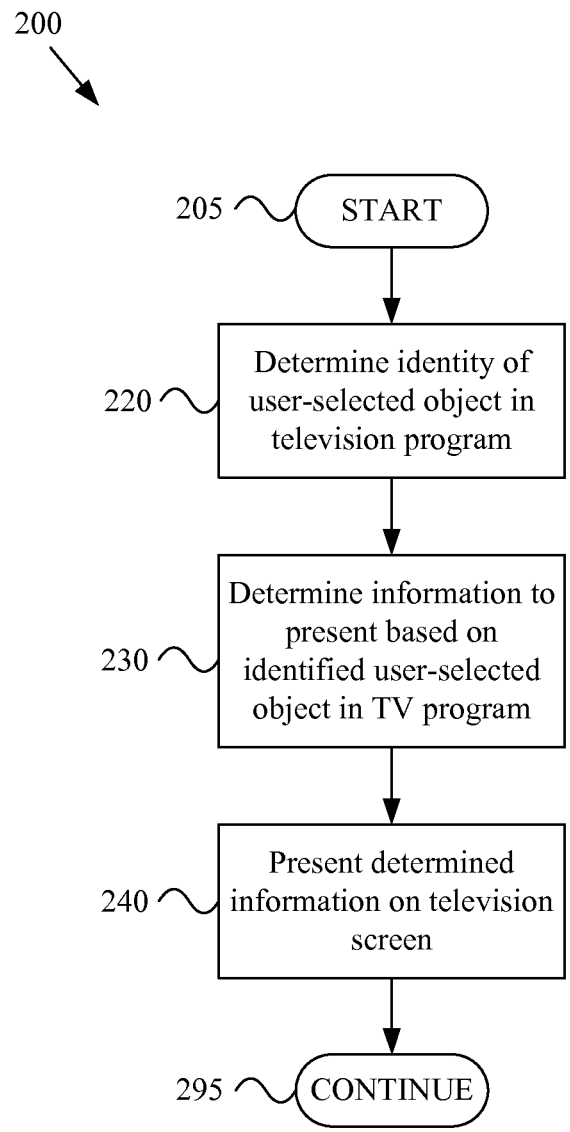
FIG. 2 is a flow diagram illustrating an exemplary method for presenting information associated with a user-selected object in a television program, in accordance with various aspects of the present invention.

FIG. 2 is a flow diagram illustrating an exemplary method 200 for responding to user-selection of objects in television programming based on geographical location, in accordance with various aspects of the present invention. Any or all aspects of the exemplary method 200 may, for example, be implemented in one or more devices (or components or modules) of a user's local television system (e.g., in any one or more of the first television 140 and/or second television 141, the television receiver 151, the first television controller 160 and/or second television controller 161, etc., shown in FIG. 1 and discussed previously).

The exemplary method 200 may, for example, begin executing at step 205. The exemplary method 200 may begin executing in response to any of a variety of causes and/or conditions, non-limiting examples of which will now be provided. For example, the exemplary method 200 may begin executing in response to a user command to begin, in response to user selection of a user-selectable object in a television program, upon television and/or television receiver and/or television controller reset or power-up, in response to a user input indicating a desire to provide object selection capability to the user, in response to identification of a user and/or user equipment for which object selection capability is to be provided, in response to receipt and/or presentation of a television program comprising user-selectable objects, in response to user payment of a fee, etc.

The exemplary method 200 may, for example at step 220, comprise determining an identity of a user-selected object in a television program being presented to a user. Step 220 may comprise performing such determining in any of a variety of manners, non-limiting examples of which will now be provided.

For example, step 220 may comprise analyzing various sensor readings to identify an object in television programming selected by a user. For example, step 220 may comprise performing such analysis in a local television system component (or device) implementing the exemplary method 200. Also for example, step 220 may comprise receiving information from another television system component (or device) identifying an object in a television program that has been selected by a user. In such an exemplary scenario, step 220 may, for example, comprise receiving object identification information from another television system component (or device) of the user's local television system and/or from another television system component remote from the user's local television system (e.g., via a direct communication link;

via a personal area network, local area network or home area network; via the Internet, etc.).

Many examples of such object-selection determination are provided in U.S. Provisional Patent Application 61/242,234, which is hereby incorporated herein by reference in its entirety. Additionally, examples of such object-selection determination are also provided in: U.S. patent application Ser. No. 12/774,380, filed May 5, 2010, titled "SYSTEM AND METHOD IN A TELEVISION FOR PROVIDING USER SELECTION OF OBJECTS IN A TELEVISION PROGRAM"; U.S. patent application Ser. No. 12/850,832, filed Aug. 5, 2010, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed Aug. 5, 2010, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/850,945, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,036, filed Aug. 5, 2010, titled "SYSTEM AND METHOD IN A TELEVISION SYSTEM FOR PROVIDING FOR USER-SELECTION OF AN OBJECT IN A TELEVISION PROGRAM"; and U.S. patent application Ser. No. 12/851,075, filed Aug. 5, 2010, titled "SYSTEM AND METHOD IN A PARALLEL TELEVISION SYSTEM FOR PROVIDING USER-SELECTION OF OBJECTS IN A TELEVISION PROGRAM". The contents of each of the above-mentioned applications are hereby incorporated herein by reference in their entirety. A user-selectable object in a television program may be identified by one or more identifiers comprising any of a variety of characteristics. For example, a user-selectable object may be identified by a universally (or globally) unique serial number. For example, a user-selectable object may be identified by a data structure that includes a plurality of code fields (e.g., country field, a company or enterprise ID field, a product type field, a product model field, a date/time field, a language field, a personal identifier, etc.). Also for example, a user-selectable object may be identified, at least in part, by a communication network address at which information about a user-selectable object may be obtained (e.g., a Universal Resource Locator (URL), an Internet address, a memory address, a database identifier, a server identifier and/or address, etc.).

In general, step 220 may comprise determining an identity of a user-selected object in a television program being presented to a user. Accordingly, the scope of various aspects of the present invention should not be limited by particular characteristics of any particular type of identification and/or of any particular manner of making such a determination unless explicitly claimed.

The exemplary method 200 may, at step 230, comprise determining, based at least in part on the determined object identity, information to present to a user. Various non-limiting examples of such actions, and associated information, will be provided below. Step 230 may comprise determining any of a variety of different types information to present (e.g., associated with any of a variety of actions) and may comprise making such determination in any of a variety of manners, non-limiting examples of which will now be provided.

Such information may, for example and without limitation, correspond to one or more actions to perform with regard to the identified user-selected object. Such determined actions may comprise any of a variety of characteristics, non-limiting examples of which will be provided throughout this discussion. Such actions may, for example, comprise determining information to present to the user, where such information is associated with a user-selected object in a television program (e.g., retrieving such information from a known location at an entity (e.g., a television system component, networked non-television system component, etc.) remote from and/or local to the user's local television system, conducting a search for such information in one or more system entities (e.g., searching entities of the user's local television system and/or searching entities remote from the user's local television system), etc.), notifying one or more other system entities (e.g., a television system component, network non-television system component, etc.) of the user's selection of the user-selected object (e.g., notifying a television network enterprise, a production enterprise, a distribution enterprise, a rating company, an advertising agency, etc.). Such actions may also, for example, comprise establishing a communication session by which a user may interact with networked entities (e.g., one or more entities local to and/or remote from the user's local television system) associated with a user-selected object (e.g., communicating regarding general object information, communicating regarding obtaining a user-selected object corresponding to a consumer good, communicating regarding membership in an organization related to the user-selected object, etc.), interacting with a user regarding local television system control and/or control of a remote television system component, interacting with a user regarding display of a user-selected object and/or associated information, etc.

For example, step 230 may comprise determining, based at least in part on the determined object identity, to obtain (or acquire) and/or obtaining one or more sets of information from a system entity (e.g., local to and/or remote from the user's local television system), where such information may then, for example, be presented to the user. Such information obtaining may comprise characteristics of any of a variety of different manners of obtaining such information.

For example, step 230 may comprise determining a memory address of a local and/or remote entity associated with the information, and retrieving the information from the determined memory address. For example, such memory address information may be stored in a table or other data structure indexed by object identity (e.g., by general object type or name, by exact object identity, by object source, etc.). Such a memory may, for example, be part of an entity (e.g., a component and/or device of a user's local television system) implementing the step 230. Such a memory may also, for example, be a memory of another television system component (e.g., a component of the user's local television system or a component remote from the user's local television system) that is communicatively coupled to the component implementing step 230 (e.g., a memory accessible by direct memory access, via an information retrieval communication protocol between components, etc.). Such a memory may additionally, for example, be a memory of a system entity that is not a television system component, but which is communicatively coupled to the system entity implementing step 230 via a communication network.

In a non-limiting exemplary scenario, a plurality of memory addresses may be associated with a user-selected object, where such memory addresses correspond to different respective locations (e.g., any of the exemplary types of locations discussed above). For example, different respective sets of information for the same user-selected object associated with different respective locations may be stored at the different respective memory locations. In such a scenario, step 230 may comprise determining the location associated with the location determined at step 225 and then selecting the memory address corresponding to the determined location.

Also for example, step 230 may comprise determining, based at least in part on the determined object identity, a communication network address (e.g., a network address of a one or more system entities (e.g., components, devices, servers, databases, etc.) remote from and/or local to the user's local television system, a television communication network address, an Internet address, a LAN address, etc.). For example, such network address information may be stored in a table or other data structure indexed by object identity (e.g., by general object type or name, by exact object identity, by object source, etc.) and/or by location (e.g., any one or more of the exemplary locations presented above). Such a network address may, for example, correspond to a network address at which information corresponding to the identified object and determined location may be obtained, a network address of a component with which a communication session may be initiated and/or conducted (e.g., to obtain information regarding the user-selected object, to interact with the user regarding the selected object, to notify of user-selection of a particular object, etc.), etc. For example, such a network address may, for example, be a network address associated with a commercial enterprise (e.g., a manufacturer, retailer, tech support, etc.) associated with the identified object. Step 230 may then, for example, comprise obtaining information from a networked entity having the identified communication network address.

In a non-limiting exemplary scenario, a plurality of network addresses may be associated with a user-selected object, where such network addresses correspond to different respective locations (e.g., any of the exemplary types of locations discussed above). For example, different respective sets of information for the same user-selected object associated with different respective locations may be stored at the different respective network locations. In such a scenario, step 230 may comprise determining the location associated with the location determined at step 225 and then selecting the network address corresponding to the determined location.

In an information-determining and presenting scenario, the information may comprise any of a variety of different types of information related to the user-selected object. For example and without limitation, the determined information may comprise information describing the object (e.g., information describing aspects of the object, history of the object, design of the object, source of the object, source of the object corresponding to the determined location, price of the object, price of the object associated with the determined location, critiques of the object, information provided by commercial enterprises producing and/or providing such object, etc.), information indicating to the user how the user may obtain the selected object, information indicating to the user how the user may obtain the selected object near the determined location, information indicating how the user may utilize the selected object, etc. The information may, for example, comprise information of one or more non-commercial organizations associated with, and/or having information pertaining to, the identified user-selected object (e.g., non-profit and/or government organization contact information, web site address information, etc.). In general, step 230 may comprise determining to obtain any of a variety of types of information corresponding to the identified user-selected object (e.g., from an entity local to and/or remote from the user's local television system), where such information may for example, be presented to the user and/or utilized to perform additional actions on behalf of the user.

Step 230 may also, for example, comprise determining to conduct and conducting, based at least in part on the determined object identity, a search for information corresponding to the identified user-selected object. Such a search may, for example, comprise a search of one or more entities (or system components or devices) local to and/or remote from the user's local television system (e.g., a search of television system components, a search of general networked entities via a general data network (e.g., the Internet, the LAN, etc.), etc.).

For example, step 230 may comprise determining, based at least in part on the determined, network search terms that may be utilized in a search engine to search for information corresponding to the user-selected object and the determined location. For example, such search term information may be stored in a table or other data structure indexed by object identity (e.g., by general object type or name, by exact object identity, by object source, etc.) and/or location (e.g., any one or more of the exemplary location types discussed previously). Such search terms may also, for example, comprise one or more search terms specifying the location (which may be retrieved from memory and/or obtained from a user via a user interface). Such search terms may, for example, utilize location to enhance the probability of returning object information that is of higher relevance to the user from a location perspective.

In another exemplary scenario, step 230 may comprise determining to request and/or requesting information for a particular user-selected object or type of user-selected object from a remote entity. For example, step 230 may comprise determining (e.g., based at least in part on the object identity determined at step 220) a network address of an information server and communicating a request to such information server for information pertaining to a particular user-selected object from such information server. In an exemplary scenario comprising a plurality of different information sources (e.g., remote information sources) for respective user-selectable objects, step 230 may comprise determining to which of the plurality of different information servers the information request should be sent. Such a determination may, for example, be based at least in part on location.

As discussed above, one or more actions determined at step 230 may comprise determining to obtain (and present) information corresponding to the user-selected object, where such information determining may, for example, comprise accessing such information directly from memory, searching for such information in a variety of manners, etc.

In an exemplary scenario in which such information corresponding to user-selectable objects is stored in one or more television system entities (or other networked entities) remote from and/or local to the user's local television system, step 230 may comprise initiating and managing an interactive session with the user to more clearly identify information desired by the user. Such an interactive session may comprise presenting associated user interface information to the user and receiving user input information from the user.

For example, step 230 may comprise determining that, since a relatively large amount of information corresponding to a user-selected object in the television program is available, additional interaction with the user is necessary to reduce the amount of information that may ultimately be presented to the user. For example, step 230 may comprise determining to provide and providing a list (or menu) of types of information available to the user and solicit input from the user regarding the selection of one or more of the listed types of information for presentation to the user. Also for example, step 230 may comprise providing the user a list of locations (e.g., locations near or within a particular distance of the location determined at step 225) to the user and soliciting input from the user regarding the selection of one or more of the presented locations. Additionally for example, step 230 may comprise identifying user interface information for presentation to the user (e.g., a user interface by which the user may further refine search terms and/or filter search results or other acquired information). Further for example, a user may utilize such user interface to specify utilization of the user's present location and/or the user's home location in acquiring (e.g., searching for) information to be presented to the user.

As discussed above, one or more of the actions determined at step 230 may comprise establishing a communication session by which a user may interact with networked entities associated with a user-selected object. For example, such networked entities may comprise components (or devices) local to and/or remote from the user's local television system. In an exemplary scenario, step 230 may comprise determining to open and/or opening a user interface session with which a user may interact with an object information database (or server) local to and/or remote from the user's local television system. Such database (or server) may, for example, comprise a television system entity, but may also comprise a database (or server) independent of a television system (e.g., a server with a general Internet presence, a server on a Local Area Network (LAN), etc.). In such an exemplary scenario, step 230 may comprise identifying the appropriate user interface information to present to the user. Such user interface information may, for example, comprise interface information regarding the communication of information to the database and/or information communicated from the database.

Also for example, in an exemplary scenario (e.g., in which a user selects an object in a television program associated with a particular person), step 230 may comprise determining to open and/or opening a communication session with such person and/or an associated organization or other entity (e.g., a telephone call may be placed, an Internet chat session may be opened, an Internet blog may be entered, an email may be sent, an instant message may be sent, a facsimile may be transmitted, etc.). In such a scenario, a user interface (e.g., a two-way user interface) may be presented to the user for use by the user to interact with networked entities associated with a user-selected object. For example, such a communication interface may be utilized by the user to interact with one or more entities local to and/or remote from the user's local television system to communicate regarding general object information, communicate regarding the user acquiring a user-selected object, communicate regarding membership in an organization and/or service related to the user-selected object, etc. In such a scenario, step 230 may comprise determining the user interface information to present to the user (e.g., on a television screen).

Also for example, such a user interface (e.g., a television control user interface) may be utilized to interact with a user regarding local television system control and/or control of a remote television system component. For example, such a user interface may be utilized to provide user control of television program presentation (e.g., user control of remote and/or local television program sources). In such a scenario, step 230 may comprise determining the user interface information to present to the user (e.g., on a television screen).

Additionally for example, such a user interface (e.g., an information presentation control interface) may be utilized to interact with a user regarding display of information associated with a user-selected object (e.g., interacting with a menu structure associated with retrieved and/or available object information, interacting with the user regarding screen location for presentation of such information, regarding size of presented information, regarding information scrolling control, regarding duration of information presentation, regarding whether to pause presentation of the television program while such information is being presented to the user, etc.). In such a scenario, step 230 may comprise determining the user interface information to present to the user (e.g., on a television screen).

Also as discussed above, one or more of the actions determined at step 230 may comprise providing a user interface (e.g., an object presentation interface) by which a user may control presentation of the user-selected object to the user. Such an action may, for example, comprise providing a user interface by which the user may pause the television program, center the object on the screen, zoom in and/or out on the object, etc. Such an action may, for example in an exemplary scenario where 3-D object information is available (e.g., stored in a networked entity remote from the user's local television system, stored in a component of the user's local television system, etc.), comprise providing a user interface by which a user may rotate the user-selected object to provide the user with a more complete understanding of the user-selected object. In another exemplary scenario, for example a scenario in which information regarding ordering the user-selected object is available for the user to consider, such an action may comprise providing a user interface by which the user may explore optional characteristics of the user-selected object (e.g., different available coloration, add-ons, delivery options, etc.). In such a scenario, step 230 may comprise determining the user interface information to present to the user (e.g., on a television screen).

Step 230 may, for example, comprise determining to perform and/or performing an action comprising notifying another entity (e.g., another entity local to and/or remote from the user's local television system) of the selection of the user-selected object. For example, step 230 may comprise establishing a communication link with any of a variety of networked entities (e.g., television broadcasters or other television providing entities, enterprises providing an object or related service, enterprises advertising an object or related service, a television program server, a television network operator, etc.).

For example, in a non-limiting exemplary scenario in which a user selects an object in a television program representing a good and/or service, step 230 may comprise determining to communicate and/or communicating a message to a commercial enterprise providing such a good and/or service. Such a message may, for example, comprise information related to the user-selected object identified at step 220, the user's location, the television program in which the user-selected object was selected, etc.). In another exemplary scenario in which a user selects an object in a television program representing a good and/or service, such a message may be sent to a third party service that tracks user interest in such a good and/or service. In yet another exemplary scenario in which a user selects an object in a television program representing a particular person (e.g., an actor, spokesperson, athlete, politician, comedian, etc.), step 230 may comprise determining to communicate and/or communicating such a message (e.g., an email message) to the particular person (and/or a representative thereof) notifying such particular person of the user selection. In such an exemplary scenario, such an outgoing message may be communicated automatically without interaction with the user, but may also be communicated after interacting with the user (e.g., to solicit permission from the user). Also, the user may be provided notification that such an outgoing message was sent. In such scenarios, step 230 may comprise determining the user interface information to present to the user (e.g., on a television screen).

As shown above, various user-selectable objects (or types of objects) may, for example, be associated with any of a variety of respective actions that may be taken upon selection of a respective user-selectable object by a user, and such actions may correspond to communicating respective types of information to the user (e.g., on the television screen). Such actions (e.g., information retrieval, information searching, television system control, communication session management, object-selection tracking, etc.) may, for example, be included in a table or other data structure. In an exemplary scenario, when a first user selects a first object in a first television program, step 230 may comprise analyzing a table to determine that the first object is associated with requesting information from a first server related to the first object, presenting such acquired information to the user, providing the user a mechanism by which the user may view such object at different angles, and presenting an advertisement to the first user showing a first on-line commercial source of such object. Continuing such exemplary scenario, when a second user selects the first object in the first television program while viewing the first television program at a second location, step 230 may comprise analyzing a table to determine that the first object is associated with requesting information from a first server related to the first object and associated with the second location, presenting such acquired information to the user, and presenting an advertisement to the user showing a second commercial source of the selected object where the second commercial source is geographically near the second location.

In another example, when a user selects an object in a television program while viewing a television program (e.g., where the object is a baseball player), step 230 may comprise analyzing a table to determine that the baseball player is associated with requesting season and lifetime statistics from a server, presenting such season and lifetime statistics, and providing a menu-based interface to the user by which the user may access (e.g., at a remote information server associated with the player, a team on which the player plays, a league in which the user plays, etc.) any of a variety of types of additional personal and/or professional information regarding the baseball player. Step 230 may also, for example, comprise determining that the selected player is associated with presenting the user with information regarding charitable organizations in the user's geographical region with which the player is associated. Such actions may, for example, be associated with any or all geographical locations. Additionally, in the same exemplary scenario, step 230 may comprise sending a message to an email address associated with the player's team to notify the team of the user's selection of the object.

In yet another example, when a user selects a landmark in a movie, step 230 may comprise analyzing a data structure to determine that the landmark is associated with acquisition (e.g., from a remote server) of historical information regarding such landmark and hours of operation and presentation of such acquired information to the user, presenting a map and transportation options to the user showing travel directions and transportation options to travel from the user's current location to the landmark, and providing a user interface by which the user may peruse an album of photographs of the landmark where such album is stored at a remote database.

In still another example, when a user located at a third location selects a food item in a movie, step 230 may comprise analyzing a table to determine that such food item, when selected at the third location, is associated with presenting a map to the user showing directions to the nearest set of restaurants at which such food item is available, and presenting hyperlinks to respective websites of such restaurants if available.

Note that in such exemplary scenarios, some actions may be associated with any location, some actions might only be associated with the selected object at some locations, and some actions, while performed for all location, may be tailored to the specific location of the user.

As discussed previously, step 230 may comprise determining and/or performing one or actions based on general type of a user-selected object or based on specific identity of a user-selected object. Step 230 may also comprising determining and/or performing one or more actions based on the general type of a user-selected object and determining and/or performing one or more actions based on specific identity (or other more specific identifying characteristics) of a user-selected object. For example, in a non-limiting exemplary scenario, user-selection of an actor may cause execution of an action generally associated with all actors (e.g., acquisition of general information of the actor from a database remote from the user's local television system, for example the actor's name, to the user on a television screen), and user-selection of the specific actor may cause execution of an action specifically associated with the selected actor (e.g., acquisition of specific information of the actor from the specific actor's personal website and providing a user interface enabling the user to interact with the actor's personal website).

Note that in all of the examples above, any or all of the descriptive information, user interface information, one and/or two-way communication information, and/or user interface capability may reside autonomously in the user's local television system (i.e., in one or more components thereof) and/or may reside in a system entity remote from the user's local television system and communicatively coupled to the user's local television system.

In general, step 230 may comprise determining, based at least in part on the determined object identity, information to present to a user. Such information may be associated with any of a variety of actions performed with regard to a user-selected object in a television program. Accordingly, the scope of various aspects of the present invention should not be limited by characteristics of any particular user-selected object and/or any particular manner of determining to present information to the user unless explicitly claimed.

As discussed above, one or more actions determined at step 230 may comprise determining to perform and/or performing actions with local and/or remote system entities, where such actions may comprise accessing information directly from memory of a system entity, searching for such information in a system entity, directly requesting a system entity for information of a user-selected object, establishing a communication link with a system entity, notifying another system entity of a user-selection of an object, etc. In such an exemplary scenario, information related to determining one or more actions to perform and/or determining how to perform such one or more determined actions may be stored in and/or accessed from one or more components of the user's local television system. Such information (or a remote portion thereof) may also, for example, be stored in and/or accessed from a system entity remote from the user's local television system.

In an exemplary scenario in which such information corresponding to selection and/or performance of actions associated with user-selectable objects is stored in one or more components of the user's local television system (e.g., a television, a television receiver, a television controller, etc.), the method 200 may comprise receiving data associating a user-selectable object in the television program with one or more actions and/or the performance thereof (e.g., including data associated with information to be presented to a user). For example, the method 200 may comprise receiving a data stream (or other data communication format, for example, a file) comprising such information, and storing such information in a memory (or database) of the user's local television system (e.g., before a need arises to access and/or utilize such information).

For example, in such a scenario, such data receiving may comprise receiving such data embedded in a same television program signal that communicates the television program to the user's local television system. Also for example, such data receiving may comprise receiving the data in parallel with receipt of a television program signal that communicates the television program to the user's local television system. Additionally for example, such data receiving may comprise receiving the data in a signal that is independent of a television program signal that communicates the television program to the user's local television system (e.g., receiving such signals from a same source and/or from different respective sources). Further for example, such data receiving may comprise receiving the data in a plurality of different signals from a plurality of different respective sources.

As discussed previously, the received object information may be stored in memory (e.g., of the user's local television system) indexed by any or all of object identification, object type, location of the user, location of the user's home television system, television program in which the object appears, scene and/or frame of the television program in which the object appears or to which an object selection window corresponds, etc. Also for example, the received object information may be stored in memory indexed (or otherwise accessible) by search terms.

Turning next to step 240, such step may comprise presenting the information determined at step 230 on a television screen (e.g., the same television screen on which the television program containing the user-selected object is presented). Step 240 may comprise presenting such information in any of a variety of manners, non-limiting examples of which will be presented below. Step 240 may, for example, presenting such information in respective manners dependent on the respective natures one or more actions associated with the presentation of such information.

For example, step 240 may comprise outputting the determined information on a television display concurrently (i.e., simultaneously or pseudo-simultaneously in a time-sharing manner) with presentation of the television program (i.e., the television program in which the user-selected object was presented). Step 240 may comprise performing such concurrent presentation in any of a variety of manners, non-limiting examples of which will now be provided.

For example, step 240 may comprise presenting the determined information by outputting the determined information on the display concurrently with presentation of the television program on the television display without altering presentation dimensions of the television program. For example, in an exemplary scenario in which a television program is being presented on the entire television display, step 240 may comprise presenting the determined information on the television display while the television program continues to be presented on the entire television display. In such a scenario, step 240 may comprise utilizing a variety of video processing techniques to perform such presentation.

For example, step 240 may comprise overlaying the information on the presented television program (e.g., using an information presentation window, an information bubble, a ticker, a scrolling banner, a menu, etc.). For example, step 240 may comprise presenting the determined information by outputting the determined information in a window of the television program. For example, step 240 may comprise forming a window having default dimensions at a default location on the television display, and presenting the information in such window. Additionally, for example, step 240 may comprise forming a window having user-specified dimensions at a user-specified location on the television display. In an exemplary scenario, step 240 may comprise providing a user-interface by which the user may adjust the characteristics (e.g., size and/or location of the window, duration of the information presentation, etc.) of such a window in the television program.

Further for example, step 240 may comprise analyzing the presented television program to determine a location and/or size of a window (or other information presentation format) that minimizes interference with the television program presentation (e.g., determining to present the information at a location on the television display corresponding to a relatively still portion of the television display). Such operation may, for example, comprise selecting between presenting the information near the top of the display or near the bottom of the display, near the left of the display, near the right of the display, etc.

In another exemplary implementation, step 240 may comprise blending the image with the presented television program, etc. In such an implementation, step 240 may comprise presenting the information in a manner in which at least a portion of the television program located in an overlapping region of the display with the presented information may be viewed. Such implementation may, for example, provide for enhanced viewing of the television program relative to an implementation where an opaque window in the television program is utilized to present the information.

Also for example, step 240 may comprise presenting the determined information by outputting the determined information on the display concurrently with presentation of the television program on the television display and altering presentation dimensions of the television program. For example, in an exemplary scenario in which a television program is being presented on the entire television display, step 240 may comprise presenting the determined information on the television display while the television program is presented with different dimensions (e.g., in a window of smaller size then the entire television display). In such a scenario, step 240 may comprise utilizing a variety of video processing techniques to perform such presentation. For example, step 240 may comprise reducing the size of the television program on the display to make room for an information window, ticker, etc. For example, step 240 may comprise reducing the size of the television program while maintaining the proper aspect ratio, but may also comprise reducing the size of the television program in a single dimension.

Additionally for example, step 240 may comprise presenting the determined information by outputting the determined information on the television display concurrently with presentation of the television program on the television display without altering presentation speed of the television program. For example, presentation of the television program on the television display may continue at normal speed during presentation of the determined information on the television display. In such an implementation, presentation of the television program may continue in real-time while step 240 presents information to the user.

As discussed above, step 240 may comprise presenting the determined information on the television display concurrently with presentation of the television program. In another exemplary scenario, step 240 may comprise presenting the determined information on the television display while pausing presentation of the television program (or otherwise presenting the television program at a non-normal presentation speed).

For example, during exemplary operation where presentation of the television program is paused, step 240 may comprise freezing a still image of the television program as background to the presented information or may comprise removing the image of the television program entirely. While step 240 comprises presenting the information as the television program presentation is paused, step 240 may also comprise recording the television program for resuming presentation of the paused presentation program in its entirety after step 240 complete presenting the information to the user. In such a scenario, step 240 may also comprise providing a user interface by which the user may fast-forward presentation of the television program to catch up to real-time presentation. In an alternative scenario, step 240 may comprise pausing presentation of the television program by communicating a signal to a television program source (e.g., a source remote from the user's local television system) to pause transmission of the television program to the user's local television system while step 240 is presenting the information on the television display.

In an exemplary scenario in which presentation of the television program is paused (or otherwise presented at a non-normal presentation speed), such pausing may be performed in response to user-selection of an object in a television program. Also, such pausing may be performed in response to other causes and/or conditions (e.g., a direct command from the user to pause the presentation, an input from the user indicating that the user desires to select an object in a television program, etc.).

Note that the method 200 may comprise interacting with a user to allow the user to specify the manner in which presentation of the information determined at step 230 is performed. For example, the method 200 may comprise interacting with the user to allow the user to specify whether, and/or under what conditions, the television program should be paused during presentation of the information, should continued to presented normally during presentation of the information, should be spatially altered during presentation of the information, etc. For example, a user may specify different manners of presentation according to different respective types of television programs and/or different types of user-selected objects. In a non-limiting exemplary scenario, the user may specify that selecting an object during a newscast does not affect normal play of the newscast while the information is being presented, selecting an object during a sporting event causes the sporting event to be paused and recorded during presentation of the information, selecting a consumer good object causes pausing of the television program during presentation of the information while selecting a person object does not cause such pausing, etc. Also, for example, a user may specify that particular types of actions associated with user-selectable objects in a television program correspond to different types of information presentation. For example, when a selection of an object results in an information bubble being presented to the user, the television program will continue to be presented in a normal manner, and when a selection of an object results in the initiation of a communication session between the user and a remote entity, the television program will be paused.

In general, step 240 may comprise presenting the information determined at step 230 on a television screen (e.g., the same television screen on which the television program containing the user-selected object is presented). Accordingly, the scope of various aspects of the present invention should not be limited by characteristics of any particular type of presenting such information or by characteristics of any particular manner of obtaining such information unless explicitly claimed.

The exemplary method 200 may, at step 295, comprise performing continued operation. Such continued operation may comprise characteristics of any of a variety of different types of continued operation, non-limiting examples of which will be presented below.

For example, step 295 may comprise looping execution flow of the exemplary method 200 back to step 220 for continued user-selected object determination, information determination and information presenting. Also for example, step 295 may comprise looping execution flow of the exemplary method 200 back to step 230 for continued information determination and presentation regarding a user-selected object. Additionally for example, step 295 may comprise performing additional user interaction with the user to further refine the user-selected object information determined at step 230 and/or presented at step 240. For example, step 295 may comprise interfacing with a user to determine which information to present, how such information should be presented, etc. Additionally for example, upon completion of the information presentation at step 240 (e.g., in a scenario in which television program presentation is paused during the performance of such actions), step 295 may comprise resuming normal presentation of the television program.

Also for example, step 295 may comprise determining when the information presentation being performed at step 240 is complete. Step 295 may, for example, comprise making such a determination in any of a variety of manners. For example and without limitation, step 295 may comprise determining that the information presentation is complete based, at least in part, on explicit user command indicating that the user no longer desires to interact with an entity remote from the user's local television system regarding user-selectable objects in television programming. Also for example, step 295 may comprise determining that the information presentation is complete based, at least in part, on user dismissal of presented information associated with a user-selected object (e.g., closing an information window and/or other GUI mechanism associated with the user-selected object). Additionally for example, step 295 may comprise determining that the information presentation is complete based, at least in part, on a timer (e.g., making such determination a predetermined amount of time after an information and/or a GUI interface is presented to a user, after a user has last interacted with the system regarding a user-selected object, etc.). Further for example, step 295 may comprise determining that the information presentation is complete based on a user command to perform some other action (e.g., a user command for normal television program play to resume (if halted), a user command for television program play at fast-forward until caught up to real-time, a user command to jump presentation of the television program to real-time, etc.).

In general, step 295 may comprise performing continued operation. Accordingly, the scope of various aspects of the present invention should not be limited by characteristics of any particular type of continued operation unless explicitly claimed.

The exemplary method 200 may be performed in any one or more components (or devices) of a user's local television system. For example, the method 200 (or a portion thereof) may be performed in a television. Also for example, the method 200 (or a portion thereof) may be performed in a television receiver (e.g., a stand-alone cable and/or satellite television receiver (or set top box), a digital video recorder with television receiver capability, a gaming device with television receiver capability, etc.). Additionally for example, the method 200 (or a portion thereof) may be performed in a television controller (e.g., a dedicated television or entertainment system remote control, a personal electronic device with television control capability, etc.). Further for example, the method 200 may be performed in any combination of the user's local television system components. For example, in a non-limiting exemplary scenario, one or more modules of a television may operate to perform at least step 220, one or more modules of a television controller may operate to perform at least step 230, and one or more modules of a television receiver may operate to perform at least step 240. Additionally, various portions of any of the above-mentioned method steps (e.g., step 220, 230 and 240) may be performed in any one or more components (or devices) remote from the user's local television system.

Additionally, the steps of the exemplary method 200 (or aspects thereof) may, for example, be performed in real-time. In such manner, the user may have relatively expeditious access to functionality associated with the user-selected object. Alternatively for example, the exemplary method 200 (or aspects thereof) may be performed off-line in a manner in which functionality associated with the user-selected object is provided to the user at a later time (e.g., after presentation of the television program, upon the user logging into the user's computer system, upon the user accessing email, etc.).

Further, any or all of the steps of the exemplary method 200 may be performed for user selection of an object in television programming as the programming is broadcast in real-time and/or may be performed for user selection of an object in television programming that has been recorded on a user (or home) television programming recorder (e.g., a personal video recorder (PVR), video cassette recorder (VCR), etc.) and is currently being presented to the user (e.g., at step 220) in a time-shifted manner. For example, a user may record a broadcast television program on a PVR for later viewing, view such recorded programming at a later time, and while viewing such time-shifted television programming at a later time, select user-selectable objects in such programming (e.g., at a particular user location, television system location, etc.).

Similarly, any or all of the steps of the exemplary method 200 may be performed for user selection of an object in television programming that has been provided to the user (or stored by the user) on a physical storage medium (e.g., on a digital versatile disc (DVD), video cassette recorder tape, non-volatile memory device, etc.). For example, a user may purchase a set of DVDs including all episodes of a season of a television series, view each of such episodes at the convenience of the user, and while viewing such episodes, select user-selectable objects in such programming. Such DVDs may, for example, comprise any or all of the above-mentioned information (e.g., information relating user-selectable objects and/or geographical location to one or more actions, memory and/or network addressing for entities remote from the user's local television system, general information corresponding to user-selectable objects, user interface information corresponding to user-selectable objects and location, executable software corresponding to user-selectable objects, etc.).

Figure 3:
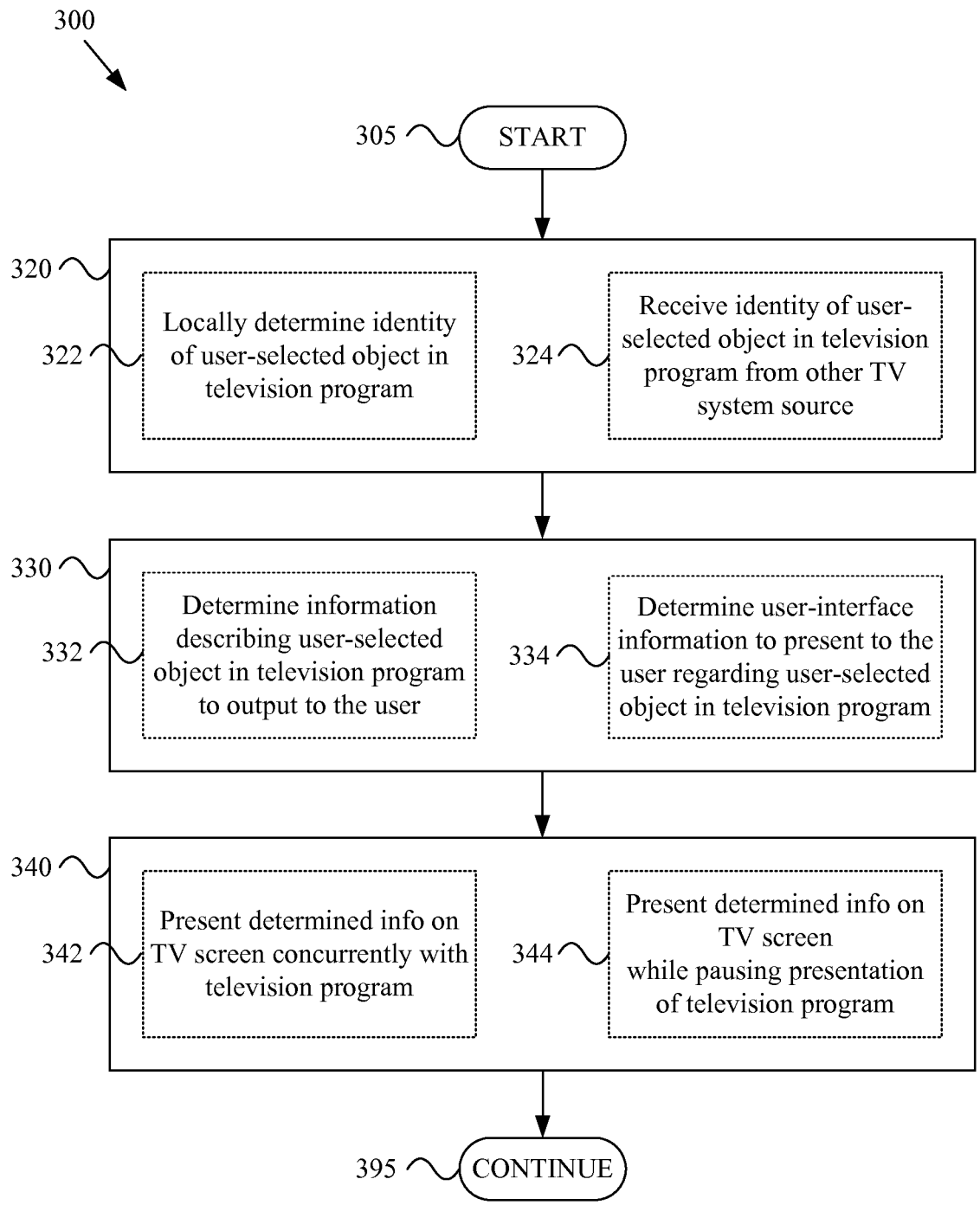
FIG. 3 is a flow diagram illustrating an exemplary method for presenting information associated with a user-selected object in a television program, in accordance with various aspects of the present invention.

Turning next to FIG. 3, such figure is a flow diagram illustrating an exemplary method 300 for presenting information associated with a user-selected object in a television program, in accordance with various aspects of the present invention. The exemplary method 300 may share any or all characteristics with the exemplary method 200 illustrated in FIG. 2 and discussed previously.

As with the exemplary method 200 discussed above, any or all aspects of the exemplary method 300 may, for example, be implemented in the user's local television system (e.g., any or all or the first television 140 and/or second television 141, the television receiver 151, the first television controller 160 and/or second television controller 161, etc., shown in FIG. 1 and discussed previously). Also as with the exemplary method 200 discussed above, portions of any of the exemplary steps of the method 300 may also be implemented in one or more components remote from the user's local television system.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may comprise presenting a television program to a user, where the program comprises user-selectable objects in the program. The method 300 may comprise presenting such television program to a user in any of a variety of manners, non-limiting examples of which will now be provided.

For example, the method 300 may comprise receiving television programming. Many non-limiting examples of such television programming were provided above. The method 300 may comprise receiving the television programming from any of a variety of sources. For example and without limitation, the method 300 may comprise receiving the television programming from a television broadcasting company, from a movie streaming company, from a user (or consumer) video recording and/or playback device (e.g., internal and/or external to the television), from an Internet television programming provider, from a gaming device comprising television program capability, from a DVD player, etc.

The method may also comprise receiving the television programming via any of a variety of types of communication networks. Such networks may, for example, comprise a wireless television network (e.g., terrestrial and/or satellite) and/or cable television network. Such networks may, for example, comprise any of variety of data communication networks (e.g., the Internet, a local area network, a personal area network, a metropolitan area network, etc.).

The method 300 may also, for example, comprise presenting received television programming to a user. The method 300 may, for example, comprise presenting television programming received (e.g., received from a local and/or non-local television program source) to a user in any of a variety of manners. For example, the method 300 may comprise presenting the television programming on one or more of a screen of a television, television controller comprising a screen, television receiver comprising a screen, personal computer system, handheld computer, etc.

The presented television programming may, for example, comprise user-selectable objects in the television programming. Many non-limiting examples of such user-selectable objects were presented above. In general, such user-selectable objects may, for example, comprise animate and/or inanimate objects in television programming that a user may select (e.g., using a pointing device, touch screen, or other user interface by which a user may identify an object in television programming being presented to the user).

In general, the method 300 may comprise presenting a television program to a user, where the program comprises user-selectable objects in the program. Accordingly, the scope of various aspects of the present invention should not be limited by characteristics of any particular manner of receiving and/or presenting such a television program to a user unless explicitly claimed.

The exemplary method 300 may, at step 320, comprise determining an identity of a user-selected object in a television program being presented to a user. Step 320 may share any or all characteristics with step 220 of the exemplary method 200 shown in FIG. 2 and discussed previously.

For example and without limitation, step 320 may comprise (e.g., at sub-step 322) locally determining such identity of a user-selected object in a component (or device) of the user's local television system and/or a component remote from the user's local television system. Also for example, step 320 may comprise (e.g., at sub-step 324) receiving identity information regarding such a user-selected object from another component (or device) of the user's local television system and/or an entity remote from the user's local television system.

The exemplary method 300 may also (e.g., at step 320 or another step), comprise determining a location (e.g., a geographical location). For example and without limitation, such location determination may comprise determining a location of the user's home television system. Also for example, such location determination may comprise determining a location of the user's local television system. Additionally for example, such location determination may comprise determining a location of the user.

The exemplary method 300 may, at step 330, comprise determining, based at least in part on the determined object identity (e.g., as determined at step 320), information to present to a user. Step 330 may, for example, share any or all characteristics with step 230 of the exemplary method 200 illustrated in FIG. 2 and discussed previously.

For example and without limitation, step 330 may (for example at sub-step 332) comprise determining information describing a user-selected object in a television program, where such information is to be presented to a user (e.g., on a television display). Also for example, step 330 may (for example at sub-step 334) comprise determining user-interface information (e.g., UI information for user control of the television system, UI information associated with communicating with another device or networked entity, UI information associated with a two-way communication session, UI information associated with ordering a consumer good, etc.) associated with a user-selected object in a television program, where such information is to be presented to a user (e.g., on a television display).

The exemplary method 300 may, at step 340, comprise presenting the information determined at step 330 on a television screen (e.g., the same television screen on which the television program containing the user-selected object is presented). Step 340 may, for example, share any or all characteristics with step 240 of the exemplary method 200 illustrated in FIG. 2 and discussed previously.

For example, step 340 may (e.g., at sub-step 342) comprise presenting the information determined at step 330 on a television display while the television program comprising the user-selected object corresponding to such determined information is also being presented on the television display. Also for example, step 340 may (e.g., at sub-step 344) comprise presenting the information determined at step 330 on a television display while presentation of the television program comprising the user-selected object corresponding to such determined information is paused.

The exemplary method 300 may, for example at step 395, comprise performing continued operations. Step 395 may, for example, share any or all characteristics with step 295 of the exemplary method 200 illustrated in FIG. 2 and discussed previously.

As discussed previously, any or all portion of the exemplary methods 200 and 300 may be implemented in one or more components (or devices) of a user's local television system and/or system entities remote from the user's local television system. Various non-limiting examples of such implementation in entities of the user's local television system will now be presented in the discussion of FIGS. 4-7. Note that, as discussed previously, at least portions of the previously-discussed steps may also be performed in components remote from the user's local television system. Accordingly, the scope of various aspects of the present invention should not be limited by the following focus on various entities of the user's local television system unless explicitly claimed.

Figure 4:
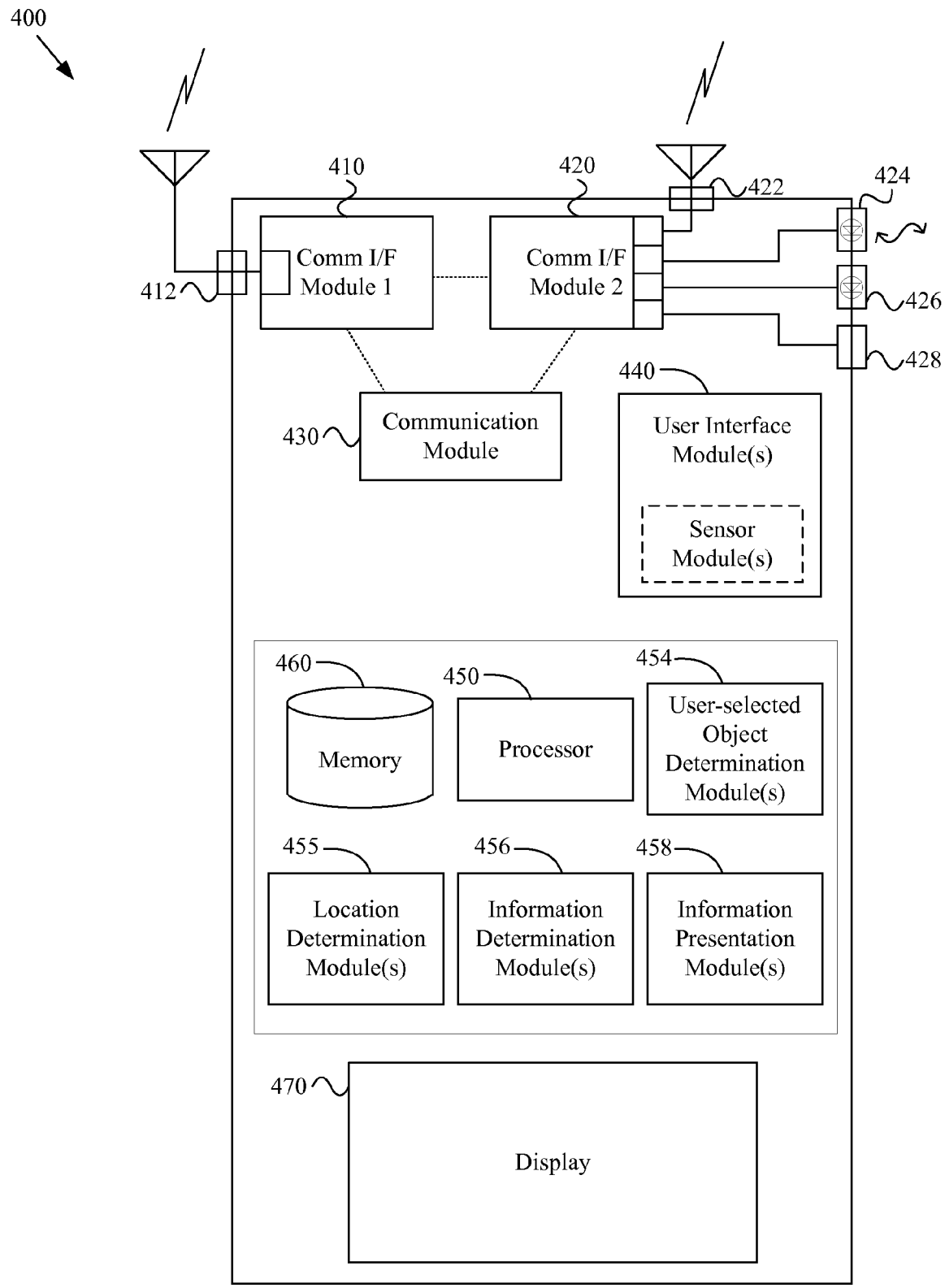
FIG. 4 is a diagram illustrating an exemplary television, in accordance with various aspects of the present invention.

Turning next to FIG. 4, such figure is a diagram illustrating an exemplary television 400, in accordance with various aspects of the present invention. The exemplary television 400 may, for example, share any or all characteristics with one or more of the exemplary televisions 140 and 141 illustrated in FIG. 1 and discussed previously. Also, the exemplary television 400 (e.g., various modules thereof) may operate to perform any or all of the functionality discussed previously with regard to the exemplary methods 200 and 300 illustrated in FIGS. 2-3 and discussed previously.

The exemplary television 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 410 may operate to communicate with local sources of television video content (e.g., video recorders, receivers, gaming devices, etc.). Additionally, for example, the first communication interface module 410 may operate to communicate with a television controller and/or a television receiver external to the television 400 (e.g., directly or via one or more intermediate communication networks).

The exemplary television 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 420 may operate to communicate with local sources of television video content (e.g., video recorders, receivers, gaming devices, etc.). Additionally, for example, the second communication module 420 may operate to communicate with a television controller (e.g., directly or via one or more intervening communication networks).

The exemplary television 400 may also comprise additional communication interface modules, which are not illustrated. Such additional communication interface modules may, for example, share any or all aspects with the first 410 and second 420 communication interface modules discussed above.

The exemplary television 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television 400 may additionally comprise one or more user interface modules 440. The user interface module(s) 440 may generally operate to provide user interface functionality to a user of the television 400. For example, and without limitation, the user interface module(s) 440 may operate to provide for user control of any or all standard television commands (e.g., channel control, volume control, on/off, screen settings, input selection, etc.). The user interface module(s) 440 may, for example, operate and/or respond to user commands utilizing user interface features disposed on the television (e.g., buttons, etc.) and may also utilize the communication module 430 (and/or first 410 and second 420 communication interface modules) to communicate with a television controller (e.g., a dedicated television remote control, a universal remote control, a cellular telephone, personal computing device, gaming controller, etc.).

Various aspects of the present invention comprise presenting information to a user (e.g., on a television display 470), where such information is related to a user-selected object in a television program. In various exemplary scenarios, such information may comprise user interface information (e.g., graphical, textual, image, video, etc.) providing information to the user and/or soliciting information from the user. In such scenarios, the user interface module(s) 440 may operate to perform such functionality. For example, the user interface module(s) may operate to interact with the information determination module(s) 456 and/or information presentation module(s) 458, discussed below.

The user interface module(s) 440 may also comprise one or more sensor modules that operate to interface with and/or control operation of any of a variety of sensors (e.g., screen pointing sensors, location sensors, etc.) that may be utilized to ascertain an on-screen pointing location. For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module(s) 440 (or sensor module(s) thereof) may operate to control the transmission of signals (e.g., RF signals, optical signals, acoustic signals, etc.) from such sensors. Additionally, the user interface module(s) 440 may perform any of a variety of video output functions (e.g., presenting television programming to a user, providing visual feedback to a user regarding an identified user-selected object in the presented television programming, etc.).

The exemplary television 400 may comprise one or more processors 450. The processor(s) 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed (in-part or in-whole) by a processor executing instructions. For example, though various modules are illustrated as separate blocks or modules in FIG. 4, such illustrative modules, or a portion thereof, may be implemented by the processor 450.

The exemplary television 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various types of information corresponding to user-selectable objects in television programming (e.g., object descriptive information, communication information, user interaction information, user control information, information describing actions to perform with local and/or remote devices and associated with user-selectable objects, commerce information, etc.) may be stored in memory. Also as discussed previously, location information (e.g., any of the exemplary types of location information discussed previously) may be stored in memory. The memory 460 provides one non-limiting example of a memory in which such information may be stored. Note that such memory 460 (or a portion thereof) may also be external to the television 400 and/or communicatively coupled thereto.

The exemplary television 400 may comprise one or more modules (not explicitly illustrated in FIG. 4) that operate to receive and present a television program to a user. Such one or more modules may, for example, operate to utilize one or more of the user interface module(s) 440 to present the television program on the display 470. The one or more modules may, for example, operate to perform television program receiving and/or presenting functionality discussed previously with regard to exemplary methods 200 and 300. Various non-limiting aspects of the present invention may comprise presenting information associated with user-selectable objects in conjunction with (or instead of) television programming. In such an exemplary scenario, one or more modules that operate to receive and present a television program to a user may operate in conjunction with the information presentation module(s) 458, discussed below.

The exemplary television 400 may comprise one or more user-selected object determination (or identification) modules 454 that operate to determining an identity of a user-selected object in a television program being presented to a user. For example, such module(s) 454 may operate to perform step 220 of the exemplary method 200 discussed previously and/or step 320 of the exemplary method 300 discussed previously.

For example, in an exemplary scenario in which the television 400 locally determines an identity of a user-selected object, the module(s) 454 may operate to utilize one or more of the user interface module(s) 440 to interface with various sensors. Additionally, for example, the module(s) 454 may operate to utilize the communication module 430 (and communication interface modules 410 and 420) to communicate with external systems regarding various sensor signals.

Also for example, in another exemplary scenario in which the television 400 operates to receive information of the identity of a user-selected object in a television program from a source external to the television 400, the module(s) 454 may operate to utilize the communication module 430 (and communication interface modules 410 and 420) to communicate with such external source.

The exemplary television 400 may comprise one or more location determination modules 455 that operate to determine a location (e.g., a point location, a region location, etc.), for example, a user location, a home television system location, a local television system location, etc. For example, such module(s) 455 may operate to perform location determination steps or sub-steps of the exemplary method 200 discussed previously and/or the exemplary method 300 discussed previously.

For example, in an exemplary scenario in which the television 400 locally determines a location, the module(s) 455 may operate to interface with one or more position sensors and process signals from such sensors to determine the location. For example, in such a scenario, the module(s) 455 may comprise GPS circuitry that operates to communicate with the global positioning system to determine location of the television 400.

Additionally for example, in an exemplary scenario in which the television 400 receives information of the location from another entity (e.g., from a personal electronic device of the user with position-determining capability, from a television service provider, from a cellular telephone company, from a user's premises-based positioning system, from an Internet service provider, etc.), the module(s) 455 may operate to utilize the communication interface module 430 (and, for example, the first communication interface module(s) 410 and/or the second communication interface module(s) 420) to receive such location information.

In another exemplary scenario, the module(s) 455 may operate to utilize the user interface module(s) 440 to interface with a user of the television 400 regarding location information. For example, the module(s) 455 may operate to utilize the user interface module(s) 440 to solicit information describing a location from a user. Also for example, the module(s) 455 may operate to utilize the user interface module(s) 440 to offer a user a list of locations from which to select.

Various non-limiting aspects of the present invention may comprise presenting information associated with user-selectable objects in conjunction with (or instead of) television programming. In such an exemplary scenario, the modules 455 may operate in conjunction with the information presentation module(s) 458, discussed below, to receive and/or present user interface information in conjunction with (and/or instead of) presentation of the television programming.

The exemplary television 400 may also, for example, comprise one or more information determination module(s) 456 that operate to determine (e.g., based at least in part on the determined identity of a user-selected object in a television program) information associated with a user-selected object for presentation to a user. For example, such module(s) 456 may operate to perform step 230 of the exemplary method 200 discussed previously and/or step 330 of the exemplary method 300 discussed previously.

For example, in a non-limiting exemplary scenario in which such information determination comprises analyzing a table or other data structure correlating object identification characteristics and/or location to particular actions (and/or information to present to a user), the module(s) 456 may operate to analyze such a table and/or other data structure stored in the memory 460. Additionally for example, in an exemplary scenario in which such information determination comprises interacting with the user to determine an initial action and/or subsequent action (and/or information) related to the identified user-selected object and/or location, the module(s) 456 may operate to utilize the user interface module(s) 440 to perform such user interaction.

In a non-limiting exemplary scenario in which a determined action comprises retrieving information associated with an object from a memory of a networked entity, the module(s) 456 may operate to communicate with such memory (e.g., either directly, for example, utilizing DMA and/or indirectly utilizing an interface of the networked entity) of the networked entity. For example, the module(s) 456 may operate to utilize the communication module 430 (and first communication interface module 410 and/or second communication interface module 420) to communicate with such networked entity. Such a networked entity may, for example, comprise a communication infrastructure component of a television system, a television server component, a cable and/or satellite head-end station, a networked information server, a remote computer communicatively coupled to the television, a component of the user's local television system, a component of the user's home television system, etc.

Also for example, in a non-limiting scenario in which a determined action comprises searching for information, the module(s) 456 may operate to perform a search for such information. In such a scenario, the module(s) 456 may, for example, operate to perform such a search in memory of other television system components and/or other networked entities (e.g., directly utilizing direct memory access and/or utilizing a search interface provided by a networked entity). For example, the module(s) 456 may operate to perform such a search in such networked entities utilizing the communication module 430 (and first communication interface module 410 and/or second communication interface module 420) to communicate with such networked entities. For example, such networked entities may provide respective interfaces specifically adapted to request and/or search for information stored in and/or accessible to such networked entities. In such a scenario, the module(s) 456 may operate in accordance with such interfaces.

In an exemplary scenario, a networked entity may operate in accordance with a protocol in which a requestor requests (via a communication network) information associated with a particular user-selected object and/or associated with a particular location, and the remote entity responds to such a request by communicating the requested information back to the requestor. In such a scenario, the module(s) 456 would operate in accordance with such protocol when interacting with the networked entity via the communication network.

Additionally for example, in a non-limiting scenario in which a determined action comprises interfacing with a user of the television 400, the module(s) 456 may operate to utilize the user interface module(s) 440 to provide the user interface. For example, in an exemplary scenario in which a determined action comprises presenting object information and/or different views of the object to a user, the module(s) 456 may operate to utilize the user interface module(s) 440 to perform such output (e.g., on the display 470 of the television 400). In such an exemplary scenario, the module(s) 456 may operate in conjunction with the user interface module(s) 440 and the information presentation module(s) 458, discussed below, to receive and/or present user interface information in conjunction with (and/or instead of) presentation of the television programming.

Further for example, in a non-limiting scenario in which a determined action comprises establishing and/or managing a communication session between the user and another networked entity (e.g., a television system and/or non-television system entity remote from the user's local television system), the module(s) 456 may operate to utilize the user interface module(s) 440 to provide the user interface and utilize the communication module(s) 430 (and first communication interface module 410 and/or second communication interface module 420) to communicate to perform communication link establishment and/or management. The module(s) 456 may also operate in conjunction with the information presentation module(s) 458, discussed below, to receive and/or present user interface information in conjunction with (and/or instead of) presentation of the television programming.

Still further for example, in a non-limiting scenario in which a determined action comprises notifying one or more other networked entities of the user's selection of the user-selected object (e.g., a production enterprise, a distribution enterprise, a rating company, an advertising agency, etc.), the module(s) 456 may operate to utilize the communication module(s) 430 (and first communication interface module 410 and/or second communication interface module 420) to perform such notification, and may also operate in conjunction with the user interface module(s) and information presentation module(s) 458, discussed below, to receive and/or present user interface information regarding such notifying in conjunction with (and/or instead of) presentation of the television programming.

The exemplary television 400 may additionally comprise one or more information presentation modules 458 that operate to present the information determined by the information determination module(s) 456. For example, the information presentation module(s) 458 may operate to perform step 240 of the exemplary method 200 discussed previously and/or step 340 of the exemplary method 300 discussed previously.

For example, the information presentation module(s) 458 may operate to output the determined information on a television display 470 concurrently (i.e., simultaneously or pseudo-simultaneously in a time-sharing manner) with presentation of the television program (i.e., the television program in which the user-selected object was presented). The module(s) 458 may operate to perform such concurrent presentation in any of a variety of manners, non-limiting examples of which will now be provided.

For example, the information presentation module(s) 458 may operate to present the determined information by operating to output the determined information on the display 470 concurrently with presentation of the television program on the television display 470 without altering presentation dimensions of the television program. For example, in an exemplary scenario in which a television program is being presented on the entire television display, the module(s) 458 may operate to present the determined information on the television display 470 while the television program continues to be presented on the entire television display 470. In such a scenario, the module(s) 458 may operate to utilize a variety of video processing techniques and/or devices to perform such presentation.

For example, the information presentation module(s) 458 may operate to overlay the information on the presented television program (e.g., using an information presentation window). For example, the module(s) 458 may operate to present the determined information by outputting the determined information in a window of the television program. For example, the module(s) 458 may operate to form a window having default dimensions at a default location on the television display, and present the information in such window. Additionally, for example, the module(s) 458 may operate to form a window having user-specified dimensions at a user-specified location on the television display. In an exemplary scenario, the module(s) 458 may operate to provide a user-interface (e.g., in conjunction with the user interface module(s) 440) by which the user may adjust the characteristics (e.g., size and/or location of the window, duration of the information presentation, etc.) of such a window in the television program.

Further for example, information presentation module(s) 458 may operate to analyze the presented television program to determine a location and/or size of a window that minimizes interference with the television program presentation (e.g., to present the information at a location on the television display corresponding to a relatively still portion of the television display). Such operation may, for example, comprise selecting between presenting the information near the top of the display or near the bottom of the display, near the left of the display, near the right of the display, etc.

In another exemplary implementation, the information presentation module(s) 458 may operate to blend the determined information with the presented television program, etc. In such an implementation, the module(s) 458 may operate to present the information in a manner in which at least a portion of the television program located in an overlapping region of the display with the presented information may be viewed. Such implementation may, for example, provide for enhanced viewing of the television program relative to an implementation where an opaque window in the television program is utilized to present the information.

Additionally for example, the information presentation module(s) 458 may operate to present the determined information by outputting the determined information on the television display concurrently with presentation of the television program on the television display without altering presentation speed of the television program. For example, presentation of the television program on the television display may continue at normal speed during presentation of the determined information on the television display. In such an implementation, presentation of the television program may continue in real-time while the module(s) 458 operate to present the information to the user.

As discussed above, the information presentation module(s) 458 may operate to present the determined information on the television display concurrently with presentation of the television program. In another exemplary scenario, the module(s) 458 may operate to present the determined information on the television display while pausing presentation of the television program (or otherwise presenting the television program at a non-normal presentation speed).

For example, during exemplary operation where presentation of the television program is paused, the information presentation module(s) 458 may operate to freeze a still image of the television program as background to the presented information or may comprise removing the image of the television program entirely. While the module(s) 458 operates to present the information as the television program presentation is paused, the module(s) 458 may also operate to record the television program for resuming presentation of the paused presentation program in its entirety after the module(s) 458 complete presenting the information to the user. In such a scenario, the module(s) 458 may operate to provide a user interface by which the user may fast-forward presentation of the television program to catch up to real-time presentation. In an alternative scenario, the module(s) 458 may operate to pause presentation of the television program by communicating a signal to a television program source (e.g., a source remote from the user's local television system) to pause transmission of the television program to the user's local television system while the module(s) 458 is operating to present the information on the television display.

Though not illustrated, the exemplary television 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 454, 455, 456 and 458) may be performed by the processor(s) 450 executing instructions stored in the memory 460.

Figure 5:
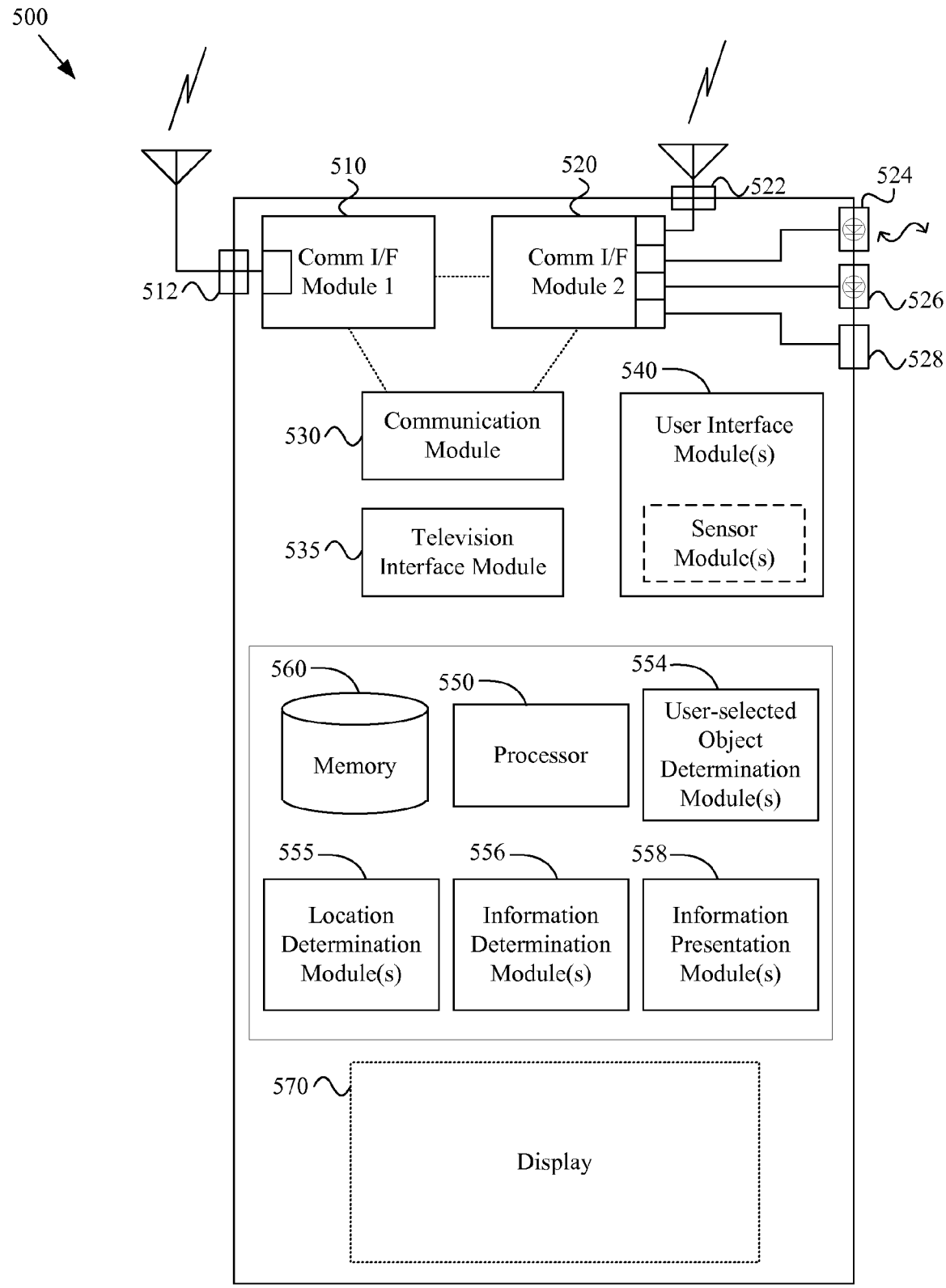
FIG. 5 is a diagram illustrating an exemplary television receiver, in accordance with various aspects of the present invention.

Turning next to FIG. 5, such figure is a diagram illustrating an exemplary television receiver 500, in accordance with various aspects of the present invention. The exemplary television receiver 500 may, for example, share any or all characteristics with the exemplary television receiver 151 illustrated in FIG. 1 and discussed previously. Also, the exemplary television receiver 500 may, for example, share any or all characteristics with the exemplary television 400 illustrated in FIG. 4 and discussed previously. For example, the exemplary television receiver 500 (e.g., various modules thereof) may operate to perform any or all of the functionality discussed previously with regard to the exemplary methods 200 and 300 illustrated in FIGS. 2-3 and discussed previously.

The exemplary television receiver 500 includes a first communication interface module 510. The first communication interface module 510 may, for example, operate to communicate over any of a variety of communication media and utilizing any of a variety of communication protocols. For example, though the first communication interface module 510 is illustrated coupled to a wireless RF antenna via a wireless port 512, the wireless medium is merely illustrative and non-limiting. The first communication interface module 510 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 510 may operate to communicate with local sources of television video content (e.g., video recorders, receivers, gaming devices, etc.). Additionally, for example, the first communication interface module 510 may operate to communicate with a television controller and/or a television (e.g., directly or via one or more intermediate communication networks).

The exemplary television receiver 500 includes a second communication interface module 520. The second communication interface module 520 may, for example, operate to communicate over any of a variety of communication media and utilizing any of a variety of communication protocols. For example, the second communication interface module 520 may communicate via a wireless RF communication port 522 and antenna, or may communicate via a non-tethered optical communication port 524 (e.g., utilizing laser diodes, photodiodes, etc.). Also for example, the second communication interface module 520 may communicate via a tethered optical communication port 526 (e.g., utilizing a fiber optic cable), or may communicate via a wired communication port 528 (e.g., utilizing coaxial cable, twisted pair, HDMI cable, Ethernet cable, any of a variety of wired component and/or composite video connections, etc.). The second communication interface module 520 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 520 may operate to communicate with local sources of television video content (e.g., video recorders, receivers, gaming devices, etc.). Additionally, for example, the second communication module 520 may operate to communicate with a television controller and/or a television external to the television receiver 500 (e.g., directly or via one or more intervening communication networks). The second communication interface module 520 may, for example, operate to communicate video and/or graphics information to a television and/or television receiver (e.g., using any of the previous interfaces mentioned above).

The exemplary television receiver 500 may also comprise additional communication interface modules, which are not illustrated. Such additional communication interface modules may, for example, share any or all aspects with the first 510 and second 520 communication interface modules discussed above.

The exemplary television receiver 500 may also comprise a communication module 530. The communication module 530 may, for example, operate to control and/or coordinate operation of the first communication interface module 510 and the second communication interface module 520 (and/or additional communication interface modules as needed). The communication module 530 may, for example, provide a convenient communication interface by which other components of the television receiver 500 may utilize the first 510 and second 520 communication interface modules. Additionally, for example, in an exemplary scenario where a plurality of communication interface modules are sharing a medium and/or network, the communication module 530 may coordinate communications to reduce collisions and/or other interference between the communication interface modules.

The exemplary television receiver 500 may also comprise one or more television interface modules 535 that operate to provide an interface between the television receiver 500 and a television (e.g., a television external to the television receiver 500 or housed with the television receiver). For example, the television interface module(s) 535 may operate to provide video, graphical and/or textual information to a television (e.g., via the communication module 530, first communication interface module(s) 510 and/or second communication interface module(s) 520). For example, various portions of the following discussion will refer to presentation of information related to a user-selected object in a television program on a television display (e.g., the same television display on which the television program is being presented). Such presentation may, for example, be performed on an optional television display 570 of the receiver and/or by utilizing the television interface module(s) 535 to communicate to a television display external to the receiver 500.

The exemplary television receiver 500 may additionally comprise one or more user interface modules 540. The user interface module(s) 540 may generally operate to provide user interface functionality to a user of the television receiver 500. For example, and without limitation, the user interface module(s) 540 may operate to provide for user control of any or all standard television commands (e.g., channel control, volume control, on/off, screen settings, input selection, etc.). The user interface module(s) 540 may, for example, operate and/or respond to user commands utilizing user interface features disposed on the television receiver 500 (e.g., buttons, etc.) and may also utilize the communication module 530 (and/or first 510 and second 520 communication interface modules) to communicate with a television controller (e.g., a dedicated television remote control, a universal remote control, a cellular telephone, personal computing device, gaming controller, etc.).

Various aspects of the present invention comprise presenting information to a user (e.g., on a television display), where such information is related to a user-selected object in a television program. In various exemplary scenarios, such information may comprise user interface information (e.g., graphical, textual, image, video, etc.) providing information to the user and/or soliciting information from the user. In such scenarios, the user interface module(s) 540 may operate to perform such functionality. For example, the user interface module(s) may operate to interact with the information determination module(s) 556 and/or information presentation module(s) 558, discussed below.

The user interface module(s) 540 may also comprise one or more sensor modules that operate to interface with and/or control operation of any of a variety of sensors (e.g., screen pointing sensors, location sensors, etc.) that may be utilized to ascertain an on-screen pointing location. For example and without limitation, the user interface module 540 (or sensor module(s) thereof) may operate to receive signals associated with respective sensors (e.g., raw or processed signals directly from the sensors, through intermediate devices, via the communication interface modules 510, 520, etc.). Also for example, in scenarios in which such sensors are active sensors (as opposed to purely passive sensors), the user interface module(s) 540 (or sensor module(s) thereof) may operate to control the transmission of signals (e.g., RF signals, optical signals, acoustic signals, etc.) from such sensors. Additionally, the user interface module(s) 540 may perform any of a variety of video output functions (e.g., presenting television programming to a user, providing visual feedback to a user regarding an identified user-selected object in the presented television programming, etc.).

The exemplary television receiver 500 may comprise one or more processors 550. The processor(s) 550 may, for example, comprise a general purpose processor, digital signal processor, application-specific processor, microcontroller, microprocessor, etc. For example, the processor 550 may operate in accordance with software (or firmware) instructions. As mentioned previously, any or all functionality discussed herein may be performed by a processor executing instructions. For example, though various modules are illustrated as separate blocks or modules in FIG. 5, such illustrative modules, or a portion thereof, may be implemented by the processor 550.

The exemplary television receiver 500 may comprise one or more memories 560. As discussed above, various aspects may be performed by one or more processors executing instructions. Such instructions may, for example, be stored in the one or more memories 560. Such memory 560 may, for example, comprise characteristics of any of a variety of types of memory. For example and without limitation, such memory 560 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various types of information corresponding to user-selectable objects in television programming (e.g., object descriptive information, communication information, user interaction information, user control information, information describing actions to perform with local and/or remote entities and associated with user-selectable objects, commerce information, etc.) may be stored in memory. Also as discussed previously, location information (e.g., any of the exemplary types of location information discussed previously) may be stored in memory. The memory 560 provides one non-limiting example of a memory in which such information may be stored. Note that such memory 560 (or a portion thereof) may also be external to the television 500 and/or communicatively coupled thereto.

The exemplary television receiver 500 may comprise one or more modules (not explicitly illustrated in FIG. 5) that operate to receive and present a television program to a user. Such one or more modules may, for example, operate to utilize one or more of the user interface module(s) 540 to present the television program on the optional display 570 (if present with the receiver 500 and/or communicatively coupled thereto). The one or more modules may, for example, operate to perform television program receiving and/or presenting functionality discussed previously with regard to the exemplary methods 200 and 300. Various non-limiting aspects of the present invention may comprise presenting information associated with user-selectable objects in conjunction with (or instead of) television programming. In such an exemplary scenario, one or more modules that operate to receive and present a television program to a user may operate in conjunction with the information presentation module(s) 558, discussed below.

The exemplary television receiver 500 may comprise one or more user-selected object determination (or identification) modules 554 that operate to determining an identity of a user-selected object in a television program being presented to a user. For example, such module(s) 554 may operate to perform step 220 of the exemplary method 200 discussed previously and/or step 320 of the exemplary method 300 discussed previously.

For example, in an exemplary scenario in which the television receiver 500 locally determines an identity of a user-selected object, the module(s) 554 may operate to utilize one or more of the user interface module(s) 540 to interface with various sensors. Additionally, for example, the module(s) 554 may operate to utilize the communication module 530 (and communication interface modules 510 and 520) to communicate with external systems regarding various sensor signals.

Also for example, in another exemplary scenario in which the television receiver 500 operates to receive information of the identity of a user-selected object in a television program from a source external to the television receiver 500, the module(s) 554 may operate to utilize the communication module 530 (and communication interface modules 510 and 520) to communicate with such external source.

The exemplary television receiver 500 may comprise one or more location determination modules 555 that operate to determine a location (e.g., a point location, a region location, etc.), for example, a user location, a home television system location, a local television system location, etc. For example, such module(s) 555 may operate to perform location determination steps or sub-steps of the exemplary method 200 discussed previously and/or the exemplary method 300 discussed previously.

For example, in an exemplary scenario in which the television receiver 500 locally determines a location, the module(s) 555 may operate to interface with one or more position sensors and process signals from such sensors to determine the location. For example, in such a scenario, the module(s) 555 may comprise GPS circuitry that operates to communicate with the global positioning system to determine location of the television receiver 500.

Additionally for example, in an exemplary scenario in which the television receiver 500 receives information of the location from another entity (e.g., from a personal electronic device of the user with position-determining capability, from a television service provider, from a cellular telephone company, from a user's premises-based positioning system, from an Internet service provider, etc.), the module(s) 555 may operate to utilize the communication interface module 530 (and, for example, the first communication interface module(s) 510 and/or the second communication interface module(s) 520) to receive such location information.

In another exemplary scenario, the module(s) 555 may operate to utilize the user interface module(s) 540 to interface with a user of the television receiver 500 regarding location information. For example, the module(s) 555 may operate to utilize the user interface module(s) 540 to solicit information describing a location from a user. Also for example, the module(s) 555 may operate to utilize the user interface module(s) 540 to offer a user a list of locations from which to select. Various non-limiting aspects of the present invention may comprise presenting information associated with user-selectable objects in conjunction with (or instead of) television programming. In such an exemplary scenario, the modules 555 may operate in conjunction with the information presentation module(s) 558, discussed below, to receive and/or present user interface information in conjunction with (and/or instead of) presentation of the television programming.

The exemplary television receiver 500 may also, for example, comprise one or more information determination module(s) 556 that operate to determine (e.g., based at least in part on the determined identity of a user-selected object in a television program) information associated with a user-selected object for presentation to a user. For example, such module(s) 556 may operate to perform step 230 of the exemplary method 200 discussed previously and/or step 330 of the exemplary method 300 discussed previously.

For example, in a non-limiting exemplary scenario in which such information determination comprises analyzing a table or other data structure correlating object identification characteristics and/or location to particular actions (and/or information to present to a user), the module(s) 556 may operate to analyze such a table and/or other data structure stored in the memory 560. Additionally for example, in an exemplary scenario in which such information determination comprises interacting with the user to determine an initial action and/or subsequent action (and/or information) related to the identified user-selected object, the module(s) 556 may operate to utilize the user interface module(s) 540 to perform such user interaction.

In a non-limiting exemplary scenario in which a determined actions comprises retrieving information associated with an object from a memory of a networked entity, the module(s) 556 may operate to communicate with such memory (e.g., either directly, for example, utilizing DMA and/or indirectly utilizing an interface of the networked entity). For example, the module(s) 556 may operate to utilize the communication module 530 (and first communication interface module 510 and/or second communication interface module 520) to communicate with such networked entity. Such a networked entity may, for example, comprise a communication infrastructure component of a television system, a television server component, a cable and/or satellite head-end station, a networked information server, a remote computer communicatively coupled to the television, a component of the user's local television system, a component of the user's home television system, etc.

Also for example, in a non-limiting scenario in which a determined action comprises searching for information, the module(s) 556 may operate to perform a search for such information. In such a scenario, the module(s) 556 may, for example, operate to perform such a search in memory of other television system components and/or other networked entities (e.g., directly utilizing direct memory access and/or utilizing a search interface provided by a networked entity). For example, the module(s) 556 may operate to perform such a search in such networked entities utilizing the communication module 530 (and first communication interface module 510 and/or second communication interface module 520) to communicate with such networked entities. For example, such networked entities may provide respective interfaces specifically adapted to request and/or search for information stored in and/or accessible to such networked entities. In such a scenario, the module(s) 556 may operate in accordance with such interfaces.

In an exemplary scenario, a networked entity may operate in accordance with a protocol in which a requestor requests (via a communication network) information associated with a particular user-selected object and/or associated with a particular location, and the remote entity responds to such a request by communicating the requested information back to the requestor. In such a scenario, the module(s) 556 would operate in accordance with such protocol when interacting with the networked entity via the communication network.

Additionally for example, in a non-limiting scenario in which a determined action comprises interfacing with a user of the television receiver 500, the module(s) 556 may operate to utilize the user interface module(s) 540 to provide the user interface. For example, in an exemplary scenario in which a determined action comprises presenting object information and/or different views of the object to a user, the module(s) 556 may operate to utilize the user interface module(s) 540 to perform such output (e.g., on the optional display 570 of the television receiver 500 if such a display 570 is included, on a display external to the receiver 500 (for example a television display), etc.). In such an exemplary scenario, the module(s) 556 may operate in conjunction with the user interface module(s) 540 and the information presentation module(s) 558, discussed below, to receive and/or present user interface information in conjunction with (and/or instead of) presentation of the television programming.

Further for example, in a non-limiting scenario in which a determined action comprises establishing and/or managing a communication session between the user and another networked entity, the module(s) 556 may operate to utilize the user interface module(s) 540 to provide the user interface and utilize the communication module(s) 530 (and first communication interface module 510 and/or second communication interface module 520) to communicate to perform communication link establishment and/or management. The module(s) 556 may also operate in conjunction with the information presentation module(s) 558, discussed below, to receive and/or present user interface information in conjunction with (and/or instead of) presentation of the television programming.

Still further for example, in a non-limiting scenario in which a determined action comprises notifying one or more other networked entities of the user's selection of the user-selected object (e.g., a production enterprise, a distribution enterprise, a rating company, an advertising agency, etc.), the module(s) 556 may operate to utilize the communication module(s) 530 (and first communication interface module 510 and/or second communication interface module 520) to perform such notification, and may also operate in conjunction with the user interface module(s) and information presentation module(s) 558, discussed below, to receive and/or present user interface information regarding such notifying in conjunction with (and/or instead of) presentation of the television programming.

The exemplary television receiver 500 may additionally comprise one or more information presentation modules 558 that operate to present the information determined by the information determination module(s) 556. For example, the information presentation module(s) 558 may operate to perform step 240 of the exemplary method 200 discussed previously and/or step 340 of the exemplary method 300 discussed previously.

For example, the information presentation module(s) 558 may operate to output the determined information on a television display (e.g., an optional display 570 of the television receiver 500 and/or an external display (for example a television display)) concurrently (i.e., simultaneously or pseudo-simultaneously in a time-sharing manner) with presentation of the television program (i.e., the television program in which the user-selected object was presented). The module(s) 558 may operate to perform such concurrent presentation in any of a variety of manners, non-limiting examples of which will now be provided.

For example, the information presentation module(s) 558 may operate to present the determined information by operating to output the determined information on the display concurrently with presentation of the television program on the television display without altering presentation dimensions of the television program. For example, in an exemplary scenario in which a television program is being presented on the entire display, the module(s) 558 may operate to present the determined information on the display while the television program continues to be presented on the entire display. In such a scenario, the module(s) 558 may operate to utilize a variety of video processing techniques and/or devices to perform such presentation.

For example, the information presentation module(s) 558 may operate to overlay the information on the presented television program (e.g., using an information presentation window). For example, the module(s) 558 may operate to present the determined information by outputting the determined information in a window of the television program. For example, the module(s) 558 may operate to form a window having default dimensions at a default location on the television display, and present the information in such window. Additionally, for example, the module(s) 558 may operate to form a window having user-specified dimensions at a user-specified location on the display. In an exemplary scenario, the module(s) 558 may operate to provide a user-interface (e.g., in conjunction with the user interface module(s) 540) by which the user may adjust the characteristics (e.g., size and/or location of the window, duration of the information presentation, etc.) of such a window in the television program.

Further for example, information presentation module(s) 558 may operate to analyze the presented television program to determine a location and/or size of a window that minimizes interference with the television program presentation (e.g., to present the information at a location on the display corresponding to a relatively still portion of the display). Such operation may, for example, comprise selecting between presenting the information near the top of the display or near the bottom of the display, near the left of the display, near the right of the display, etc.

In another exemplary implementation, the information presentation module(s) 558 may operate to blend the determined information with the presented television program, etc. In such an implementation, the module(s) 558 may operate to present the information in a manner in which at least a portion of the television program located in an overlapping region of the display with the presented information may be viewed. Such implementation may, for example, provide for enhanced viewing of the television program relative to an implementation where an opaque window in the television program is utilized to present the information.

Additionally for example, the information presentation module(s) 558 may operate to present the determined information by outputting the determined information on the display (e.g., an optional display 570 of the television receiver 500 and/or a display external to the television receiver (for example a television display)) concurrently with presentation of the television program on the display without altering presentation speed of the television program. For example, presentation of the television program on the display may continue at normal speed during presentation of the determined information on the display. In such an implementation, presentation of the television program may continue in real-time while the module(s) 558 operate to present the information to the user.

As discussed above, the information presentation module(s) 558 may operate to present the determined information on the display concurrently with presentation of the television program. In another exemplary scenario, the module(s) 558 may operate to present the determined information on the display while pausing presentation of the television program (or otherwise presenting the television program at a non-normal presentation speed).

For example, during exemplary operation where presentation of the television program is paused, the information presentation module(s) 558 may operate to freeze a still image of the television program as background to the presented information or may comprise removing the image of the television program entirely. While the module(s) 558 operates to present the information as the television program presentation is paused, the module(s) 558 may also operate to record the television program for resuming presentation of the paused presentation program in its entirety after the module(s) 558 complete presenting the information to the user. In such a scenario, the module(s) 558 may operate to provide a user interface by which the user may fast-forward presentation of the television program to catch up to real-time presentation. In an alternative scenario, the module(s) 558 may operate to pause presentation of the television program by communicating a signal to a television program source (e.g., a source remote from the user's local television system) to pause transmission of the television program to the user's local television system while the module(s) 558 is operating to present the information on the display.

Though not illustrated, the exemplary television receiver 500 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 554, 555, 556 and 558) may be performed by the processor(s) 550 executing instructions stored in the memory 560.

Figure 6:
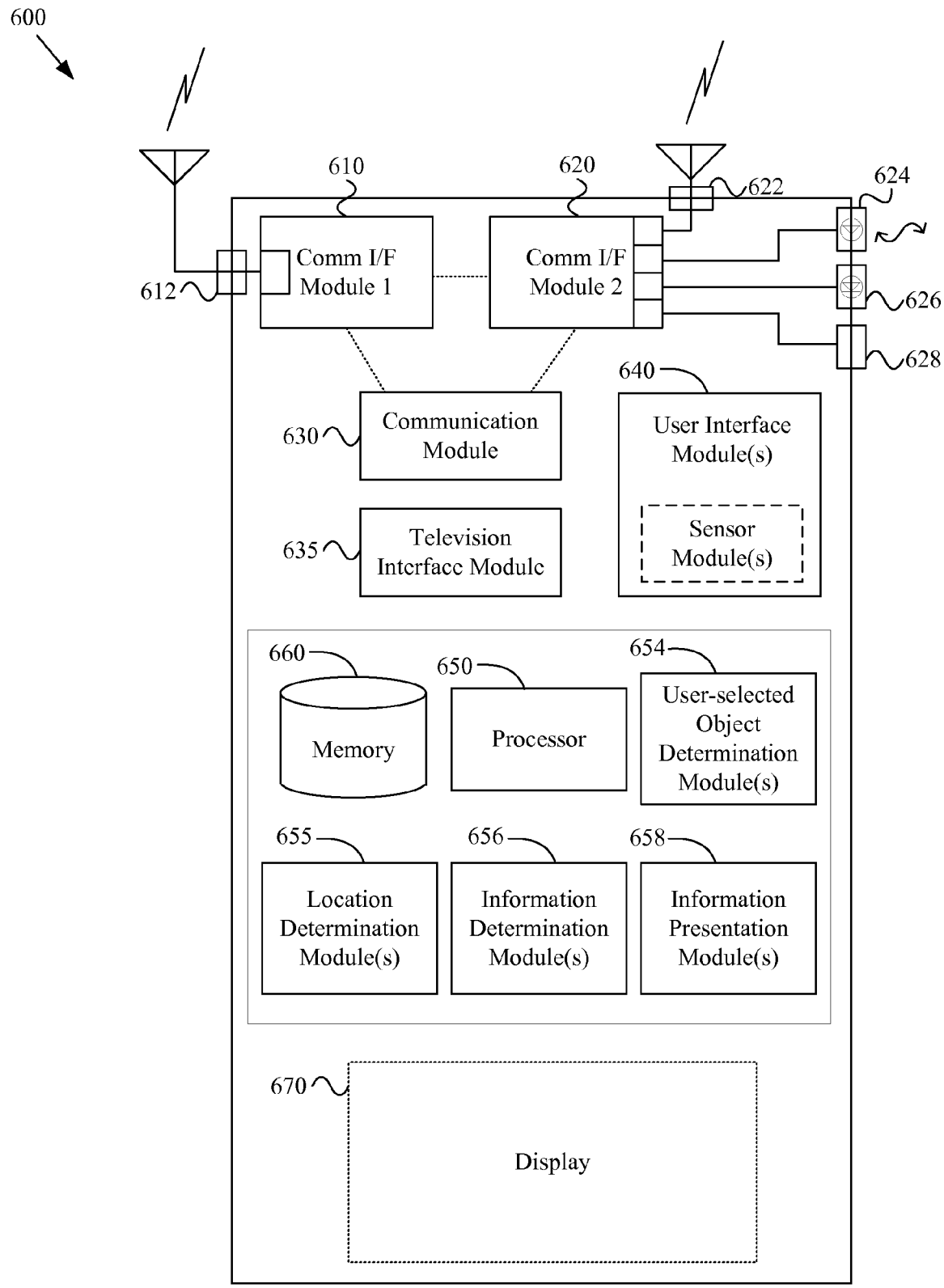
FIG. 6 is a diagram illustrating an exemplary television controller, in accordance with various aspects of the present invention.

Turning next to FIG. 6, such figure is a diagram illustrating an exemplary television controller 600, in accordance with various aspects of the present invention. The exemplary television controller 600 may, for example, share any or all characteristics with the exemplary television controllers 160 and 161 illustrated in FIG. 1 and discussed previously. Also, the exemplary television controller 600 may, for example, share any or all characteristics with the exemplary television 400 illustrated in FIG. 4 and discussed previously and/or with the exemplary television receiver 500 illustrated in FIG. 5 and discussed previously. For example, the exemplary television controller 600 (e.g., various modules thereof) may operate to perform any or all of the functionality discussed previously with regard to the exemplary methods 200 and 300 illustrated in FIGS. 2-3 and discussed previously.

The exemplary television controller 600 includes a first communication interface module 610. The first communication interface module 610 may, for example, operate to communicate over any of a variety of communication media and utilizing any of a variety of communication protocols. For example, though the first communication interface module 610 is illustrated coupled to a wireless RF antenna via a wireless port 612, the wireless medium is merely illustrative and non-limiting. The first communication interface module 610 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 610 may operate to communicate with local sources of television video content (e.g., video recorders, receivers, gaming devices, etc.). Additionally, for example, the first communication interface module 610 may operate to communicate with a television controller and/or a television (e.g., directly or via one or more intermediate communication networks).

The exemplary television controller 600 includes a second communication interface module 620. The second communication interface module 620 may, for example, operate to communicate over any of a variety of communication media and utilizing any of a variety of communication protocols. For example, the second communication interface module 520 may communicate via a wireless RF communication port 622 and antenna, or may communicate via a non-tethered optical communication port 624 (e.g., utilizing laser diodes, photodiodes, etc.). Also for example, the second communication interface module 620 may communicate via a tethered optical communication port 626 (e.g., utilizing a fiber optic cable), or may communicate via a wired communication port 628 (e.g., utilizing coaxial cable, twisted pair, HDMI cable, Ethernet cable, any of a variety of wired component and/or composite video connections, etc.). The second communication interface module 620 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 620 may operate to communicate with local sources of television video content (e.g., video recorders, receivers, gaming devices, etc.). Additionally, for example, the second communication module 620 may operate to communicate with a television controller and/or a television external to the television controller 600 (e.g., directly or via one or more intervening communication networks). The second communication interface module 620 may, for example, operate to communicate video and/or graphics information to a television and/or television receiver (e.g., using any of the previous interfaces mentioned above).

The exemplary television controller 600 may also comprise additional communication interface modules, which are not illustrated. Such additional communication interface modules may, for example, share any or all aspects with the first 610 and second 620 communication interface modules discussed above.

The exemplary television controller 600 may also comprise a communication module 630. The communication module 630 may, for example, operate to control and/or coordinate operation of the first communication interface module 610 and the second communication interface module 620 (and/or additional communication interface modules as needed). The communication module 630 may, for example, provide a convenient communication interface by which other components of the television controller 600 may utilize the first 610 and second 620 communication interface modules. Additionally, for example, in an exemplary scenario where a plurality of communication interface modules are sharing a medium and/or network, the communication module 630 may coordinate communications to reduce collisions and/or other interference between the communication interface modules.

The exemplary television controller 600 may also comprise one or more television interface modules 635 that operate to provide an interface between the television controller 600 and a television (e.g., a television external to the television controller 600). For example, the television interface module(s) 635 may operate to provide video, graphical and/or textual information to a television and/or television receiver (e.g., via the communication module 630, first communication interface module(s) 610 and/or second communication interface module(s) 620). For example, various portions of the following discussion will refer to presentation of information related to a user-selected object in a television program on a television display (e.g., the same television display on which the television program is being presented). Such presentation may, for example, be performed on an optional television display 670 of the controller and/or by utilizing the television interface module(s) 635 to communicate to a television display external to the controller 600

The exemplary television controller 600 may additionally comprise one or more user interface modules 640. The user interface module(s) 640 may generally operate to provide user interface functionality to a user of the television controller 600. For example, and without limitation, the user interface module(s) 640 may operate to provide for user control of any or all standard television commands (e.g., channel control, volume control, on/off, screen settings, input selection, etc.). The user interface module(s) 640 may, for example, operate and/or respond to user commands utilizing user interface features disposed on the television controller 600 (e.g., buttons, etc.) and may also utilize the communication module 630 (and/or first 610 and second 620 communication interface modules) to communicate with a television and/or television receiver.

Various aspects of the present invention comprise presenting information to a user (e.g., on a television display), where such information is related to a user-selected object in a television program. In various exemplary scenarios, such information may comprise user interface information (e.g., graphical, textual, image, video, etc.) providing information to the user and/or soliciting information from the user. In such scenarios, the user interface module(s) 640 may operate to perform such functionality. For example, the user interface module(s) may operate to interact with the information determination module(s) 656 and/or information presentation module(s) 658, discussed below.

The user interface module(s) 640 may also comprise one or more sensor modules that operate to interface with and/or control operation of any of a variety of sensors (e.g., screen pointing sensors, location sensors, etc.) that may be utilized to ascertain an on-screen pointing location. For example and without limitation, the user interface module 640 (or sensor module(s) thereof) may operate to receive signals associated with respective sensors (e.g., raw or processed signals directly from the sensors, through intermediate devices, via the communication interface modules 610, 620, etc.). Also for example, in scenarios in which such sensors are active sensors (as opposed to purely passive sensors), the user interface module(s) 640 (or sensor module(s) thereof) may operate to control the transmission of signals (e.g., RF signals, optical signals, acoustic signals, etc.) from such sensors. Additionally, the user interface module(s) 640 may perform any of a variety of video output functions (e.g., presenting television programming to a user, providing visual feedback to a user regarding an identified user-selected object in the presented television programming, etc.).

The exemplary television controller 600 may comprise one or more processors 650. The processor(s) 650 may, for example, comprise a general purpose processor, digital signal processor, application-specific processor, microcontroller, microprocessor, etc. For example, the processor 650 may operate in accordance with software (or firmware) instructions. As mentioned previously, any or all functionality discussed herein may be performed by a processor executing instructions. For example, though various modules are illustrated as separate blocks or modules in FIG. 6, such illustrative modules, or a portion thereof, may be implemented by the processor 650.

The exemplary television controller 600 may comprise one or more memories 660. As discussed above, various aspects may be performed by one or more processors executing instructions. Such instructions may, for example, be stored in the one or more memories 660. Such memory 660 may, for example, comprise characteristics of any of a variety of types of memory. For example and without limitation, such memory 660 may comprise one or more memory chips (e.g., ROM, RAM, EPROM, EEPROM, flash memory, one-time-programmable OTP memory, etc.), hard drive memory, CD memory, DVD memory, etc.

Also as discussed previously, various types of information corresponding to user-selectable objects in television programming (e.g., object descriptive information, communication information, user interaction information, user control information, information describing actions to perform with local and/or remote entities and associated with user-selectable objects, commerce information, etc.) may be stored in memory. Also as discussed previously, location information (e.g., any of the exemplary types of location information discussed previously) may be stored in memory. The memory 660 provides one non-limiting example of a memory in which such information may be stored. Note that such memory 660 (or a portion thereof) may also be external to the television 600 and/or communicatively coupled thereto.

The exemplary television controller 600 may comprise one or more modules (not explicitly illustrated in FIG. 6) that operate to receive and present a television program to a user. Such one or more modules may, for example, operate to utilize one or more of the user interface module(s) 640 to present the television program on the optional display 670 (if present with the television controller 600 and/or communicatively coupled thereto). The one or more modules may, for example, operate to perform television program receiving and/or presenting functionality discussed previously with regard to the exemplary methods 200 and 300. Various non-limiting aspects of the present invention may comprise presenting information associated with user-selectable objects in conjunction with (or instead of) television programming. In such an exemplary scenario, one or more modules that operate to receive and present a television program to a user may operate in conjunction with the information presentation module(s) 658, discussed below.

The exemplary television controller 600 may comprise one or more user-selected object determination (or identification) modules 654 that operate to determining an identity of a user-selected object in a television program being presented to a user. For example, such module(s) 654 may operate to perform step 220 of the exemplary method 200 discussed previously and/or step 320 of the exemplary method 300 discussed previously.

For example, in an exemplary scenario in which the television controller 600 locally determines an identity of a user-selected object, the module(s) 654 may operate to utilize one or more of the user interface module(s) 640 to interface with various sensors. Additionally, for example, the module(s) 654 may operate to utilize the communication module 630 (and communication interface modules 610 and 620) to communicate with external systems regarding various sensor signals.

Also for example, in another exemplary scenario in which the television controller 600 operates to receive information of the identity of a user-selected object in a television program from a source external to the television controller 600, the module(s) 654 may operate to utilize the communication module 630 (and communication interface modules 610 and 620) to communicate with such external source.

The exemplary television controller 600 may comprise one or more location determination modules 655 that operate to determine a location (e.g., a point location, a region location, etc.), for example, a user location, a home television system location, a local television system location, etc. For example, such module(s) 655 may operate to perform location determination steps or sub-steps of the exemplary method 200 discussed previously and/or the exemplary method 300 discussed previously.

For example, in an exemplary scenario in which the television controller 600 locally determines a location, the module(s) 655 may operate to interface with one or more position sensors and process signals from such sensors to determine the location. For example, in such a scenario, the module(s) 655 may comprise GPS circuitry that operates to communicate with the global positioning system to determine location of the television controller 600.

Additionally for example, in an exemplary scenario in which the television controller 600 receives information of the location from another entity (e.g., from a personal electronic device of the user with position-determining capability, from a television service provider, from a cellular telephone company, from a user's premises-based positioning system, from an Internet service provider, etc.), the module(s) 655 may operate to utilize the communication interface module 630 (and, for example, the first communication interface module(s) 610 and/or the second communication interface module(s) 620) to receive such location information.

In another exemplary scenario, the module(s) 655 may operate to utilize the user interface module(s) 640 to interface with a user of the television controller 600 regarding location information. For example, the module(s) 655 may operate to utilize the user interface module(s) 640 to solicit information describing a location from a user. Also for example, the module(s) 655 may operate to utilize the user interface module(s) 640 to offer a user a list of locations from which to select. Various non-limiting aspects of the present invention may comprise presenting information associated with user-selectable objects in conjunction with (or instead of) television programming. In such an exemplary scenario, the modules 655 may operate in conjunction with the information presentation module(s) 658, discussed below, to receive and/or present user interface information in conjunction with (and/or instead of) presentation of the television programming.

The exemplary television controller 600 may also, for example, comprise one or more information determination module(s) 656 that operate to determine (e.g., based at least in part on the determined identity of a user-selected object in a television program) information associated with a user-selected object for presentation to a user. For example, such module(s) 656 may operate to perform step 230 of the exemplary method 200 discussed previously and/or step 330 of the exemplary method 300 discussed previously.

For example, in a non-limiting exemplary scenario in which such action determination comprises analyzing a table or other data structure correlating object identification characteristics and/or location to particular actions (and/or information to present to a user), the module(s) 656 may operate to analyze such a table and/or other data structure stored in the memory 660. Additionally for example, in an exemplary scenario in which such information determination comprises interacting with the user to determine an initial action and/or subsequent action (and/or information) related to the identified user-selected object, the module(s) 656 may operate to utilize the user interface module(s) 640 to perform such user interaction.

In a non-limiting exemplary scenario in which a determined action comprises retrieving information associated with an object from memory of a networked entity, the module(s) 656 may operate to communicate with such memory (e.g., either directly, for example, utilizing DMA and/or indirectly utilizing an interface of the networked entity). For example, the module(s) 656 may operate to utilize the communication module 630 (and first communication interface module 610 and/or second communication interface module 620) to communicate with such networked entity. Such a networked entity may, for example, comprise a communication infrastructure component of a television system, a television server component, a cable and/or satellite head-end station, a networked information server, a remote computer communicatively coupled to the television, a component of the user's local television system, a component of the user's home television system, etc.

Also for example, in a non-limiting scenario in which a determined action comprises searching for information, the module(s) 656 may operate to perform a search for such information. In such a scenario, the module(s) 656 may, for example, operate to perform such a search in memory of other television system components and/or other networked entities (e.g., directly utilizing direct memory access and/or utilizing a search interface provided by a networked entity). For example, the module(s) 656 may operate to perform such a search in such networked entities utilizing the communication module 630 (and first communication interface module 610 and/or second communication interface module 620) to communicate with such networked entities. For example, such networked entities may provide respective interfaces specifically adapted to request and/or search for information stored in and/or accessible to such networked entities. In such a scenario, the module(s) 656 may operate in accordance with such interface.

In an exemplary scenario, a networked entity may operate in accordance with a protocol in which a requestor requests (via a communication network) information associated with a particular user-selected object and/or associated with a particular location, and the networked entity responds to such a request by communicating the requested information back to the requestor. In such a scenario, the module(s) 656 would operate in accordance with such protocol when interacting with the networked entity via the communication network.

Additionally for example, in a non-limiting scenario in which a determined action comprises interfacing with a user of the television controller 600, the module(s) 656 may operate to utilize the user interface module(s) 640 to provide the user interface. For example, in an exemplary scenario in which a determined action comprises presenting object information and/or different views of the object to a user, the module(s) 656 may operate to utilize the user interface module(s) 640 to perform such output (e.g., on the optional display 670 of the television controller 600 if such a display 670 is included, on a display external to the controller 600 (for example a television display), etc.). In such an exemplary scenario, the module(s) 656 may operate in conjunction with the user interface module(s) 640 and the information presentation module(s) 658, discussed below, to receive and/or present user interface information in conjunction with (and/or instead of) presentation of the television programming Further for example, in a non-limiting scenario in which a determined action comprises establishing and/or managing a communication session between the user and another networked entity, the module(s) 656 may operate to utilize the user interface module(s) 640 to provide the user interface and utilize the communication module(s) 630 (and first communication interface module 610 and/or second communication interface module 620) to communicate to perform communication link establishment and/or management. The module(s) 656 may also operate in conjunction with the information presentation module(s) 658, discussed below, to receive and/or present user interface information in conjunction with (and/or instead of) presentation of the television programming.

Still further for example, in a non-limiting scenario in which a determined action comprises notifying one or more other networked entities of the user's selection of the user-selected object (e.g., a production enterprise, a distribution enterprise, a rating company, an advertising agency, etc.), the module(s) 656 may operate to utilize the communication module(s) 630 (and first communication interface module 610 and/or second communication interface module 620) to perform such notification, and may also operate in conjunction with the user interface module(s) and information presentation module(s) 658, discussed below, to receive and/or present user interface information regarding such notifying in conjunction with (and/or instead of) presentation of the television programming.

The exemplary television controller 600 may additionally comprise one or more information presentation modules 658 that operate to present the information determined by the information determination module(s) 656. For example, the information presentation module(s) 658 may operate to perform step 240 of the exemplary method 200 discussed previously and/or step 340 of the exemplary method 300 discussed previously.

For example, the information presentation module(s) 658 may operate to output the determined information on a television display (e.g., an optional display 670 of the television controller 600 and/or an external display (for example a television display)) concurrently (i.e., simultaneously or pseudo-simultaneously in a time-sharing manner) with presentation of the television program (i.e., the television program in which the user-selected object was presented). The module(s) 658 may operate to perform such concurrent presentation in any of a variety of manners, non-limiting examples of which will now be provided.

For example, the information presentation module(s) 658 may operate to present the determined information by operating to output the determined information on the display concurrently with presentation of the television program on the television display without altering presentation dimensions of the television program. For example, in an exemplary scenario in which a television program is being presented on the entire display, the module(s) 658 may operate to present the determined information on the display while the television program continues to be presented on the entire display. In such a scenario, the module(s) 658 may operate to utilize a variety of video processing techniques and/or devices to perform such presentation.

For example, the information presentation module(s) 658 may operate to overlay the information on the presented television program (e.g., using an information presentation window). For example, the module(s) 658 may operate to present the determined information by outputting the determined information in a window of the television program. For example, the module(s) 658 may operate to form a window having default dimensions at a default location on the television display, and present the information in such window. Additionally, for example, the module(s) 658 may operate to form a window having user-specified dimensions at a user-specified location on the display. In an exemplary scenario, the module(s) 658 may operate to provide a user-interface (e.g., in conjunction with the user interface module(s) 640) by which the user may adjust the characteristics (e.g., size and/or location of the window, duration of the information presentation, etc.) of such a window in the television program.

Further for example, information presentation module(s) 658 may operate to analyze the presented television program to determine a location and/or size of a window that minimizes interference with the television program presentation (e.g., to present the information at a location on the display corresponding to a relatively still portion of the display). Such operation may, for example, comprise selecting between presenting the information near the top of the display or near the bottom of the display, near the left of the display, near the right of the display, etc.

In another exemplary implementation, the information presentation module(s) 658 may operate to blend the determined information with the presented television program, etc. In such an implementation, the module(s) 658 may operate to present the information in a manner in which at least a portion of the television program located in an overlapping region of the display with the presented information may be viewed. Such implementation may, for example, provide for enhanced viewing of the television program relative to an implementation where an opaque window in the television program is utilized to present the information.

Additionally for example, the information presentation module(s) 658 may operate to present the determined information by outputting the determined information on the display (e.g., an optional display 670 of the television controller 600 and/or a display external to the television controller (for example a television display)) concurrently with presentation of the television program on the display without altering presentation speed of the television program. For example, presentation of the television program on the display may continue at normal speed during presentation of the determined information on the display. In such an implementation, presentation of the television program may continue in real-time while the module(s) 658 operate to present the information to the user.

As discussed above, the information presentation module(s) 658 may operate to present the determined information on the display concurrently with presentation of the television program. In another exemplary scenario, the module(s) 658 may operate to present the determined information on the display while pausing presentation of the television program (or otherwise presenting the television program at a non-normal presentation speed).

For example, during exemplary operation where presentation of the television program is paused, the information presentation module(s) 658 may operate to freeze a still image of the television program as background to the presented information or may comprise removing the image of the television program entirely. While the module(s) 658 operates to present the information as the television program presentation is paused, the module(s) 658 may also operate to record the television program for resuming presentation of the paused presentation program in its entirety after the module(s) 658 complete presenting the information to the user. In such a scenario, the module(s) 658 may operate to provide a user interface by which the user may fast-forward presentation of the television program to catch up to real-time presentation. In an alternative scenario, the module(s) 658 may operate to pause presentation of the television program by communicating a signal to a television program source (e.g., a source remote from the user's local television system) to pause transmission of the television program to the user's local television system while the module(s) 658 is operating to present the information on the display.

Note that in various implementations where the information determined by the information determination module(s) 656 is presented by the information presentation module(s) 658 on a television display (i.e., a television external to the controller 600), the information presentation module(s) may, for example, utilize the communication module 630 to communicate the information to devices external to the controller 600 for ultimate display of such information. Note that in various scenarios, the controller 600 may also communicate the television program to such devices.

Though not illustrated, the exemplary television controller 600 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 654, 655, 656 and 658) may be performed by the processor(s) 650 executing instructions stored in the memory 660.

Though the previous discussions of FIGS. 4-6 presented various exemplary modules of a television 400, television receiver 500 and television controller 600, as discussed previously, various aspects of the present invention may be performed in a distributed system (e.g., by a plurality of components of the user's local television system and/or by a plurality of components remote from the user's local television system). Accordingly, the scope of various aspects of the present invention should not be limited to performance by a single television system component (or device) unless explicitly claimed.

Figure 7:
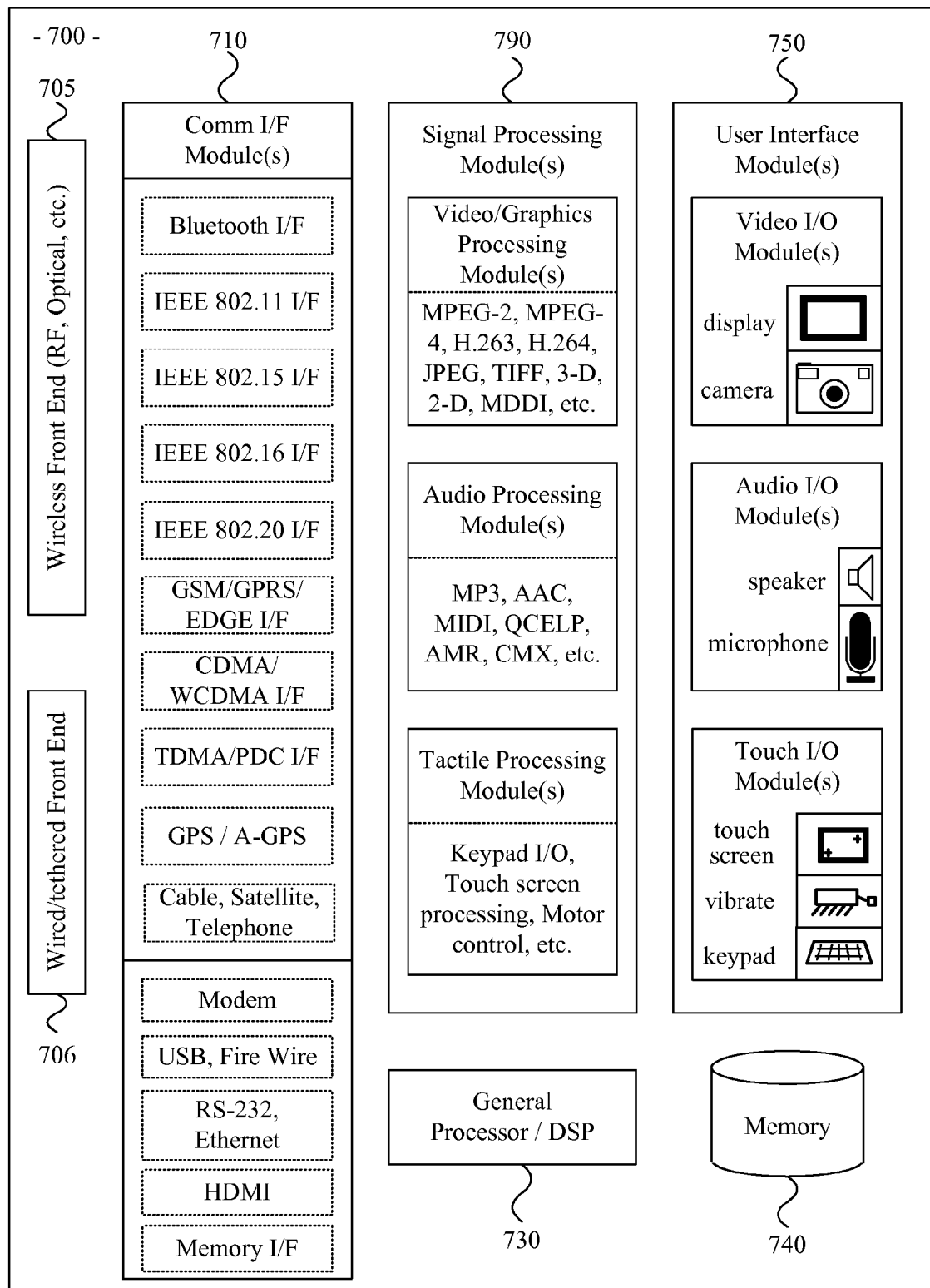
FIG. 7 is a diagram illustrating exemplary modules and/or sub-modules for a television system, in accordance with various aspects of the present invention.

Turning next to FIG. 7, such figure is a diagram illustrating exemplary modules and/or sub-modules for a television system, in accordance with various aspects of the present invention. The exemplary television system 700 may share any or all aspects with any of the television 400, television receiver 500 and/or television controller 600 illustrated in FIGS. 4-6 and discussed above. The exemplary television system 700 may, for example, share any or all characteristics with one or more of the exemplary televisions 140 and 141, television controllers 160 and 161, television receiver 151, television provider 110 and/or third party program information provider illustrated in FIG. 1 and discussed previously. Also, the exemplary television system 700 (e.g., various modules thereof) may operate to perform any or all of the functionality discussed previously with regard to the exemplary methods 200 and 300 illustrated in FIGS. 2-3 and discussed previously. The components of the exemplary television system 700 may be disposed in a single television system component (e.g., a single television, a single television receiver, a single television controller, etc.) or dispersed in a plurality of television system components (e.g., a plurality of components of a user's local television system, a combination of components comprising one or more components of the user's local television system and one or more components remote to the user's local television system, etc.).

For example, the television system 700 comprises a processor 730. Such a processor 730 may, for example, share any or all characteristics with the processors 450, 550 and 650 discussed with regard to FIGS. 4-6. Also for example, the television system 700 comprises a memory 740. Such memory 740 may, for example, share any or all characteristics with the memory 460, 560 and 660 discussed with regard to FIGS. 4-6.

Also for example, the television system 700 may comprise any of a variety of user interface module(s) 750. Such user interface module(s) 750 may, for example, share any or all characteristics with the user interface module(s) 440, 540 and 640 discussed previously with regard to FIGS. 4-6. For example and without limitation, the user interface module(s) 750 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television system 700 may also, for example, comprise any of a variety of communication modules (705, 706, and 710). Such communication module(s) may, for example, share any or all characteristics with the communication interface module(s) 410, 420, 510, 520, 610 and 620 discussed previously with regard to FIGS. 4-6. For example and without limitation, the communication interface module(s) 710 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television system 700 is also illustrated as comprising various wired 706 and/or wireless 705 front-end modules that may, for example, be included in the communication interface modules and/or utilized thereby.

The exemplary television system 700 may also comprise any of a variety of signal processing module(s) 790. Such signal processing module(s) 790 may share any or all characteristics with modules of the exemplary television 400, television receiver 500 and/or television controller 600 that perform signal processing. Such signal processing module(s) 790 may, for example, be utilized to assist in processing various types of information discussed previously (e.g., with regard to sensor processing, position determination, video processing, image processing, audio processing, general user interface information data processing, etc.). For example and without limitation, the signal processing module(s) 790 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

In summary, various aspects of the present invention provide a system and method in a television system for presenting information associated with a user-selected object in a television program, substantially as shown in and/or described in connection with at least one of the figures, as set forth more completely in the claims. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method, in a television system, for presenting information regarding user-selected objects in television programming, the method comprising:

determining an identity of a user-selected object in a television program being presented to a user;

determining, based at least in part on the identity of the user-selected object in the television program, information to present to the user;

and presenting the determined information to the user on a television display, wherein the determined information is presented in a first manner for a first object type and a second manner for a second object type, the television program being presented in a default manner in response to the first object type being selected and the television program is paused and recorded in response to the second object type being selected.

2. The method of claim 1, wherein said presenting the determined information comprises outputting the determined information on the television display concurrently with presentation of the television program on the television display.

3. The method of claim 2, wherein said presenting the determined information comprises outputting the determined information on the television display concurrently with presentation of the television program on the television display without altering presentation dimensions of the television program.

4. The method of claim 2, wherein said presenting the determined information comprises outputting the determined information in a window of the television program, where one or both of size or location of the window is user-definable.

5. The method of claim 2, wherein said presenting the determined information comprises outputting the determined information on the television display concurrently with presentation of the television program on the television display without altering presentation speed of the television program.

6. The method of claim 1, wherein said determining information to present to the user comprises determining user interface information to present to the user associated with the user-selected object.

7. The method of claim 6, wherein the user interface information comprises information associated with the user performing a commercial transaction associated with the user-selected object.

8. The method of claim 6, wherein the user interface information comprises information associated with the user requesting additional information associated with the user-selected object.

9. The method of claim 6, wherein the user interface information comprises information associated with a two-way communication session between the user and a networked entity remote from the television system regarding the user-selected object.

10. The method of claim 6, wherein the user interface information comprises information associated with the user controlling the manner in which information associated with user-selected objects is presented to the user.

11. The method of claim 1, wherein said identity determining, information determining and said information presenting are performed locally in the television system.

12. The method of claim 1, wherein conditions are defined under which a presentation speed of the television program is altered during the presenting of the determined information.

13. The method of claim 1, wherein conditions are defined under which the television program is spatially altered during the presenting of the determined information.

14. A television system for presenting information regarding user-selected objects in television programming, the television system comprising:
at least one module operable to, at least:
determine an identity of a user-selected object in a television program being presented to a user;
determine, based at least in part on the identity of the user-selected object in the television program, information to present to the user;
and
present the determined information to the user on a television display, wherein the television program is presented in a first manner in response to a first object type being selected and the television program is paused and recorded in response to a second object type being selected.

15. The television system of claim 14, wherein said at least one module is operable to present the determined information by, at least in part, operating to output the determined information on the television display concurrently with presentation of the television program on the television display.

16. The television system of claim 15, wherein said at least one module is operable to present the determined information by, at least in part, operating to output the determined information on the television display concurrently with presentation of the television program on the television display without altering presentation dimensions of the television program.

17. The television system of claim 15, wherein said at least one module is operable to present the determined information by, at least in part, operating to output the determined information in a window of the television program, where one or both of the or location of the window is user-definable.

18. The television system of claim 15, wherein said at least one module is operable to present the determined information by, at least in part, operating to output the determined information on the television display concurrently with presentation of the television program on the television display without altering presentation speed of the television program.

19. The television system of claim 14, wherein the at least one module is operable to determine information to present to the user by, at least in part, operating to determine user interface information to present to the user associated with the user-selected object.

20. The television system of claim 19, wherein the user interface information comprises information associated with the user performing a commercial transaction associated with the user-selected object.

21. The television system of claim 19, wherein the user interface information comprises information associated with the user requesting additional information associated with the user-selected object.

22. The television system of claim 19, wherein the user interface information comprises information associated with a two-way communication session between the user and a networked entity remote from the television system regarding the user-selected object.

23. The television system of claim 19, wherein the user interface information comprises information associated with the user controlling the manner in which information associated with user-selected objects is presented to the user.

24. The television system of claim 14, wherein said at least one module is located locally in the television system.

25. The television system of claim 14, wherein conditions are defined under which the at least one module is operable to alter a presentation speed of the television program during the presenting of the determined information.

26. The television system of claim 14, wherein conditions are defined under which the at least one module is operable to spatially alter the television program during the presenting of the determined information.

27. The television system of claim 14, wherein the at least one module is operable to present the determined information in a first manner for a first program type and a second manner for a second program type.

28. The television system of claim 27, wherein the at least one module is operable to play the television program in a default manner for the first program type and the at least one module is operable to pause and record the television program for the second program type.

29. A method, in a television system, for presenting information regarding user-selected objects in television programming, the method comprising:
presenting a television program to a user at a first speed;
determining an identity of a user-selected object in the television program;
determining, based at least in part on the identity of the user-selected object in the television program, information to present to the user; and
presenting the determined information to the user on a television display, wherein the television program is presented in a default manner in response to a first object type being selected and the television program is paused and recorded in response to a second object type being selected.

* * * * *

UNITED STATES PATENT AND TRADEMARK OFFICE
CERTIFICATE OF CORRECTION

PATENT NO. : 9,043,833 B2  
APPLICATION NO. : 12/881067  
DATED : May 26, 2015  
INVENTOR(S) : Jeyhan Karaoguz et al.

Page 1 of 1

It is certified that error appears in the above-identified patent and that said Letters Patent is hereby corrected as shown below:

In the Claims

Column 50, Claim 17, Line 17, delete "the" and insert --size--. (first occurrence)

Signed and Sealed this  
Ninth Day of February, 2016

Michelle K. Lee  
*Director of the United States Patent and Trademark Office*